(12) United States Patent
Megiddo et al.

(10) Patent No.: US 11,210,066 B2
(45) Date of Patent: Dec. 28, 2021

(54) FIXED VALUE MULTIPLICATION USING FIELD-PROGRAMMABLE GATE ARRAY

(71) Applicant: INTERNATIONAL BUSINESS MACHINES CORPORATION, Armonk, NY (US)

(72) Inventors: Nimrod Megiddo, Palo Alto, CA (US); Charles Edwin Cox, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 16/865,754

(22) Filed: May 4, 2020

(65) Prior Publication Data

US 2021/0342119 A1    Nov. 4, 2021

(51) Int. Cl.
*G06F 7/523* (2006.01)
*G06F 1/03* (2006.01)

(52) U.S. Cl.
CPC ............... *G06F 7/523* (2013.01); *G06F 1/03* (2013.01)

(58) Field of Classification Search
CPC .................................. G06F 7/523; G06F 1/03
USPC ........................................................ 708/625
See application file for complete search history.

(56) References Cited

U.S. PATENT DOCUMENTS

| | | | |
|---|---|---|---|
| 4,709,343 A * | 11/1987 | Van Cang | H03H 17/0294 708/301 |
| 5,742,180 A | 4/1998 | Dehon | |
| 6,567,834 B1 | 5/2003 | Marshall et al. | |
| 7,030,650 B1 | 4/2006 | Kaptanoglu | |
| 7,379,509 B2 * | 5/2008 | Pao | H03C 3/40 332/103 |
| 8,352,532 B1 * | 1/2013 | Kostarnov | G06F 7/5324 708/625 |
| 2012/0166512 A1 * | 6/2012 | Wong | G06F 7/535 708/650 |

OTHER PUBLICATIONS

S. Mittal, A Survey of FPGA-based Accelerators for Convolutional Neural Networks Neural Computing and Applications, Sep. 2018, DOI: 10.1007/s00521-018-3761-1. Published Oct. 6, 2018. 32 pages.

* cited by examiner

*Primary Examiner* — Tan V Mai
(74) *Attorney, Agent, or Firm* — Cantor Colburn LLP; Randall Bluestone

(57) ABSTRACT

A method for multiplying two binary numbers includes configuring, in an integrated circuit, a plurality of lookup tables based on a known binary number (w). The lookup tables can be configured in three layers. The method further includes receiving, by the integrated circuit, an input binary number (d). The method further includes determining, by the integrated circuit, a multiplication result (p) of the known binary number w and the input binary number d by determining each bit ($p_i$) from p using the lookup tables based on specific combinations of bits from the known binary number w and from the input binary number d, wherein a notation $j_x$ represents the $x^{th}$ bit of j from the right, with bit $j_0$ being the rightmost bit of j.

27 Claims, 17 Drawing Sheets

| $Z_{16}$ | $q_{10}$ | $q_{9..8}$ | $q_7$ | $q_6$ | $r_{13}$ | $r_{12}$ |
|---|---|---|---|---|---|---|
| 0 | 0 | 0 | 0 | 0 | 0 | 0 |
| 0 | 0 | 0 | 0 | 0 | 0 | 1 |
| 0 | 0 | 0 | 0 | 0 | 1 | 0 |
| 0 | 0 | 0 | 0 | 0 | 1 | 1 |
| 0 | 0 | 0 | 0 | 1 | 0 | 0 |
| 0 | 0 | 0 | 0 | 1 | 0 | 1 |
| 0 | 0 | 0 | 0 | 1 | 1 | 0 |
| 0 | 0 | 0 | 0 | 1 | 1 | 1 |
| 0 | 0 | 0 | 1 | 0 | 0 | 0 |
| 0 | 0 | 0 | 1 | 0 | 0 | 1 |
| 0 | 0 | 0 | 1 | 0 | 1 | 0 |
| 0 | 0 | 0 | 1 | 0 | 1 | 1 |
| 0 | 0 | 0 | 1 | 1 | 0 | 0 |
| 0 | 0 | 0 | 1 | 1 | 0 | 1 |
| 0 | 0 | 0 | 1 | 1 | 1 | 0 |
| 0 | 0 | 0 | 1 | 1 | 1 | 1 |
| 0 | 0 | 1 | 0 | 0 | 0 | 0 |
| 0 | 0 | 1 | 0 | 0 | 0 | 1 |
| 0 | 0 | 1 | 0 | 0 | 1 | 0 |
| 0 | 0 | 1 | 0 | 0 | 1 | 1 |
| 0 | 0 | 1 | 0 | 1 | 0 | 0 |
| 0 | 0 | 1 | 0 | 1 | 0 | 1 |
| 0 | 0 | 1 | 0 | 1 | 1 | 0 |
| 1 | 0 | 1 | 0 | 1 | 1 | 1 |
| 0 | 0 | 1 | 1 | 0 | 0 | 0 |
| 0 | 0 | 1 | 1 | 0 | 0 | 1 |
| 1 | 0 | 1 | 1 | 0 | 1 | 0 |
| 1 | 0 | 1 | 1 | 0 | 1 | 1 |
| 0 | 0 | 1 | 1 | 1 | 0 | 0 |
| 1 | 0 | 1 | 1 | 1 | 0 | 1 |
| 1 | 0 | 1 | 1 | 1 | 1 | 0 |
| 1 | 0 | 1 | 1 | 1 | 1 | 1 |
| 1 | 1 | 0 | 0 | 0 | 0 | 0 |
| 1 | 1 | 0 | 0 | 0 | 0 | 1 |
| 1 | 1 | 0 | 0 | 0 | 1 | 0 |
| 1 | 1 | 0 | 0 | 0 | 1 | 1 |
| 1 | 1 | 0 | 0 | 1 | 0 | 0 |
| 1 | 1 | 0 | 0 | 1 | 0 | 1 |
| 1 | 1 | 0 | 0 | 1 | 1 | 0 |
| 1 | 1 | 0 | 0 | 1 | 1 | 1 |
| 1 | 1 | 0 | 1 | 0 | 0 | 0 |
| 1 | 1 | 0 | 1 | 0 | 0 | 1 |
| 1 | 1 | 0 | 1 | 0 | 1 | 0 |
| 1 | 1 | 0 | 1 | 0 | 1 | 1 |
| 1 | 1 | 0 | 1 | 1 | 0 | 0 |
| 1 | 1 | 0 | 1 | 1 | 0 | 1 |
| 1 | 1 | 0 | 1 | 1 | 1 | 0 |
| 1 | 1 | 0 | 1 | 1 | 1 | 1 |
| 1 | 1 | 1 | 0 | 0 | 0 | 0 |
| 1 | 1 | 1 | 0 | 0 | 0 | 1 |
| 1 | 1 | 1 | 0 | 0 | 1 | 0 |
| 1 | 1 | 1 | 0 | 0 | 1 | 1 |
| 1 | 1 | 1 | 0 | 1 | 0 | 0 |
| 1 | 1 | 1 | 0 | 1 | 0 | 1 |
| 1 | 1 | 1 | 0 | 1 | 1 | 0 |
| 0 | 1 | 1 | 0 | 1 | 1 | 1 |
| 1 | 1 | 1 | 1 | 0 | 0 | 0 |
| 1 | 1 | 1 | 1 | 0 | 0 | 1 |
| 0 | 1 | 1 | 1 | 0 | 1 | 0 |
| 0 | 1 | 1 | 1 | 0 | 1 | 1 |
| 1 | 1 | 1 | 1 | 1 | 0 | 0 |
| 0 | 1 | 1 | 1 | 1 | 0 | 1 |
| 0 | 1 | 1 | 1 | 1 | 1 | 0 |
| 0 | 1 | 1 | 1 | 1 | 1 | 1 |

| $P_{10}$ | $y_{10}$ | $y_9$ | $x_9$ |
|---|---|---|---|
| 0 | 0 | 0 | 0 |
| 0 | 0 | 0 | 1 |
| 0 | 0 | 1 | 0 |
| 1 | 0 | 1 | 1 |
| 1 | 1 | 0 | 0 |
| 1 | 1 | 0 | 1 |
| 1 | 1 | 1 | 0 |
| 0 | 1 | 1 | 1 |

920

| $P_9$ | $y_9$ | $x_9$ |
|---|---|---|
| 0 | 0 | 0 |
| 1 | 0 | 1 |
| 1 | 1 | 0 |
| 0 | 1 | 1 |

910

| $P_{11}$ | $y_{11}$ | $y_{10..9}$ | $x_9$ |
|---|---|---|---|
| 0 | 0 | 0 | 0 |
| 0 | 0 | 0 | 1 |
| 0 | 0 | 1 | 0 |
| 1 | 0 | 1 | 1 |
| 1 | 1 | 0 | 0 |
| 1 | 1 | 0 | 1 |
| 1 | 1 | 1 | 0 |
| 0 | 1 | 1 | 1 |

930

| $c_{14}$ | $P_{13}$ | $z_{13}$ | $z_{12}$ | $y_{12}$ | $y_{11..9}$ | $x_9$ |
|---|---|---|---|---|---|---|
| 0 | 0 | 0 | 0 | 0 | 0 | 0 |
| 0 | 0 | 0 | 0 | 0 | 0 | 1 |
| 0 | 0 | 0 | 0 | 0 | 1 | 0 |
| 0 | 0 | 0 | 0 | 0 | 1 | 1 |
| 0 | 0 | 0 | 0 | 1 | 0 | 0 |
| 0 | 0 | 0 | 0 | 1 | 0 | 1 |
| 0 | 0 | 0 | 0 | 1 | 1 | 0 |
| 0 | 1 | 0 | 0 | 1 | 1 | 1 |
| 0 | 0 | 0 | 1 | 0 | 0 | 0 |
| 0 | 0 | 0 | 1 | 0 | 0 | 1 |
| 0 | 0 | 0 | 1 | 0 | 1 | 0 |
| 0 | 1 | 0 | 1 | 0 | 1 | 1 |
| 0 | 1 | 0 | 1 | 1 | 0 | 0 |
| 0 | 1 | 0 | 1 | 1 | 0 | 1 |
| 0 | 1 | 0 | 1 | 1 | 1 | 0 |
| 0 | 1 | 0 | 1 | 1 | 1 | 1 |
| 0 | 1 | 1 | 0 | 0 | 0 | 0 |
| 0 | 1 | 1 | 0 | 0 | 0 | 1 |
| 0 | 1 | 1 | 0 | 0 | 1 | 0 |
| 0 | 1 | 1 | 0 | 0 | 1 | 1 |
| 0 | 1 | 1 | 0 | 1 | 0 | 0 |
| 0 | 1 | 1 | 0 | 1 | 0 | 1 |
| 0 | 1 | 1 | 0 | 1 | 1 | 0 |
| 1 | 0 | 1 | 0 | 1 | 1 | 1 |
| 0 | 1 | 1 | 1 | 0 | 0 | 0 |
| 0 | 1 | 1 | 1 | 0 | 0 | 1 |
| 0 | 1 | 1 | 1 | 0 | 1 | 0 |
| 1 | 0 | 1 | 1 | 0 | 1 | 1 |
| 1 | 0 | 1 | 1 | 1 | 0 | 0 |
| 1 | 0 | 1 | 1 | 1 | 0 | 1 |
| 1 | 0 | 1 | 1 | 1 | 1 | 0 |
| 1 | 0 | 1 | 1 | 1 | 1 | 1 |

| $P_{12}$ | $z_{12}$ | $y_{12}$ | $y_{11..9}$ | $x_9$ |
|---|---|---|---|---|
| 0 | 0 | 0 | 0 | 0 |
| 0 | 0 | 0 | 0 | 1 |
| 0 | 0 | 0 | 1 | 0 |
| 1 | 0 | 0 | 1 | 1 |
| 1 | 0 | 1 | 0 | 0 |
| 1 | 0 | 1 | 0 | 1 |
| 1 | 0 | 1 | 1 | 0 |
| 0 | 0 | 1 | 1 | 1 |
| 1 | 1 | 0 | 0 | 0 |
| 1 | 1 | 0 | 0 | 1 |
| 1 | 1 | 0 | 1 | 0 |
| 0 | 1 | 0 | 1 | 1 |
| 0 | 1 | 1 | 0 | 0 |
| 0 | 1 | 1 | 0 | 1 |
| 0 | 1 | 1 | 1 | 0 |
| 1 | 1 | 1 | 1 | 1 |

| $P_{14}$ | $z_{14}$ | $z_{13}$ | $z_{12}$ | $y_{12}$ | $y_{11..9}$ | $x_9$ |
|---|---|---|---|---|---|---|
| 0 | 0 | 0 | 0 | 0 | 0 | 0 |
| 0 | 0 | 0 | 0 | 0 | 0 | 1 |
| 0 | 0 | 0 | 0 | 0 | 1 | 0 |
| 0 | 0 | 0 | 0 | 0 | 1 | 1 |
| 0 | 0 | 0 | 0 | 1 | 0 | 0 |
| 0 | 0 | 0 | 0 | 1 | 0 | 1 |
| 0 | 0 | 0 | 0 | 1 | 1 | 0 |
| 0 | 0 | 0 | 0 | 1 | 1 | 1 |
| 0 | 0 | 0 | 1 | 0 | 0 | 0 |
| 0 | 0 | 0 | 1 | 0 | 0 | 1 |
| 0 | 0 | 0 | 1 | 0 | 1 | 0 |
| 0 | 0 | 0 | 1 | 0 | 1 | 1 |
| 0 | 0 | 0 | 1 | 1 | 0 | 0 |
| 0 | 0 | 0 | 1 | 1 | 0 | 1 |
| 0 | 0 | 0 | 1 | 1 | 1 | 0 |
| 0 | 0 | 0 | 1 | 1 | 1 | 1 |
| 0 | 0 | 1 | 0 | 0 | 0 | 0 |
| 0 | 0 | 1 | 0 | 0 | 0 | 1 |
| 0 | 0 | 1 | 0 | 0 | 1 | 0 |
| 0 | 0 | 1 | 0 | 0 | 1 | 1 |
| 0 | 0 | 1 | 0 | 1 | 0 | 0 |
| 0 | 0 | 1 | 0 | 1 | 0 | 1 |
| 0 | 0 | 1 | 0 | 1 | 1 | 0 |
| 1 | 0 | 1 | 0 | 1 | 1 | 1 |
| 0 | 0 | 1 | 1 | 0 | 0 | 0 |
| 0 | 0 | 1 | 1 | 0 | 0 | 1 |
| 0 | 0 | 1 | 1 | 0 | 1 | 0 |
| 1 | 0 | 1 | 1 | 0 | 1 | 1 |
| 1 | 0 | 1 | 1 | 1 | 0 | 0 |
| 1 | 0 | 1 | 1 | 1 | 0 | 1 |
| 1 | 0 | 1 | 1 | 1 | 1 | 0 |
| 1 | 0 | 1 | 1 | 1 | 1 | 1 |
| 1 | 1 | 0 | 0 | 0 | 0 | 0 |
| 1 | 1 | 0 | 0 | 0 | 0 | 1 |
| 1 | 1 | 0 | 0 | 0 | 1 | 0 |
| 1 | 1 | 0 | 0 | 0 | 1 | 1 |
| 1 | 1 | 0 | 0 | 1 | 0 | 0 |
| 1 | 1 | 0 | 0 | 1 | 0 | 1 |
| 1 | 1 | 0 | 0 | 1 | 1 | 0 |
| 1 | 1 | 0 | 0 | 1 | 1 | 1 |
| 1 | 1 | 0 | 1 | 0 | 0 | 0 |
| 1 | 1 | 0 | 1 | 0 | 0 | 1 |
| 1 | 1 | 0 | 1 | 0 | 1 | 0 |
| 1 | 1 | 0 | 1 | 0 | 1 | 1 |
| 1 | 1 | 0 | 1 | 1 | 0 | 0 |
| 1 | 1 | 0 | 1 | 1 | 0 | 1 |
| 1 | 1 | 0 | 1 | 1 | 1 | 0 |
| 1 | 1 | 0 | 1 | 1 | 1 | 1 |
| 1 | 1 | 1 | 0 | 0 | 0 | 0 |
| 1 | 1 | 1 | 0 | 0 | 0 | 1 |
| 1 | 1 | 1 | 0 | 0 | 1 | 0 |
| 1 | 1 | 1 | 0 | 0 | 1 | 1 |
| 1 | 1 | 1 | 0 | 1 | 0 | 0 |
| 1 | 1 | 1 | 0 | 1 | 0 | 1 |
| 1 | 1 | 1 | 0 | 1 | 1 | 0 |
| 0 | 1 | 1 | 0 | 1 | 1 | 1 |
| 1 | 1 | 1 | 1 | 0 | 0 | 0 |
| 1 | 1 | 1 | 1 | 0 | 0 | 1 |
| 1 | 1 | 1 | 1 | 0 | 1 | 0 |
| 0 | 1 | 1 | 1 | 0 | 1 | 1 |
| 0 | 1 | 1 | 1 | 1 | 0 | 0 |
| 0 | 1 | 1 | 1 | 1 | 0 | 1 |
| 0 | 1 | 1 | 1 | 1 | 1 | 0 |
| 0 | 1 | 1 | 1 | 1 | 1 | 1 |

| $P_{15}$ | $z_{15}$ | $z_{14..13}$ | $z_{12}$ | $y_{12}$ | $y_{11..9}$ | $x_9$ |
|---|---|---|---|---|---|---|
| 0 | 0 | 0 | 0 | 0 | 0 | 0 |
| 0 | 0 | 0 | 0 | 0 | 0 | 1 |
| 0 | 0 | 0 | 0 | 0 | 1 | 0 |
| 0 | 0 | 0 | 0 | 0 | 1 | 1 |
| 0 | 0 | 0 | 0 | 1 | 0 | 0 |
| 0 | 0 | 0 | 0 | 1 | 0 | 1 |
| 0 | 0 | 0 | 0 | 1 | 1 | 0 |
| 0 | 0 | 0 | 0 | 1 | 1 | 1 |
| 0 | 0 | 0 | 1 | 0 | 0 | 0 |
| 0 | 0 | 0 | 1 | 0 | 0 | 1 |
| 0 | 0 | 0 | 1 | 0 | 1 | 0 |
| 0 | 0 | 0 | 1 | 0 | 1 | 1 |
| 0 | 0 | 0 | 1 | 1 | 0 | 0 |
| 0 | 0 | 0 | 1 | 1 | 0 | 1 |
| 0 | 0 | 0 | 1 | 1 | 1 | 0 |
| 0 | 0 | 0 | 1 | 1 | 1 | 1 |
| 0 | 0 | 1 | 0 | 0 | 0 | 0 |
| 0 | 0 | 1 | 0 | 0 | 0 | 1 |
| 0 | 0 | 1 | 0 | 0 | 1 | 0 |
| 0 | 0 | 1 | 0 | 0 | 1 | 1 |
| 0 | 0 | 1 | 0 | 1 | 0 | 0 |
| 0 | 0 | 1 | 0 | 1 | 0 | 1 |
| 0 | 0 | 1 | 0 | 1 | 1 | 0 |
| 1 | 0 | 1 | 0 | 1 | 1 | 1 |
| 0 | 0 | 1 | 1 | 0 | 0 | 0 |
| 0 | 0 | 1 | 1 | 0 | 0 | 1 |
| 0 | 0 | 1 | 1 | 0 | 1 | 0 |
| 1 | 0 | 1 | 1 | 0 | 1 | 1 |
| 1 | 0 | 1 | 1 | 1 | 0 | 0 |
| 1 | 0 | 1 | 1 | 1 | 0 | 1 |
| 1 | 0 | 1 | 1 | 1 | 1 | 0 |
| 1 | 0 | 1 | 1 | 1 | 1 | 1 |
| 1 | 1 | 0 | 0 | 0 | 0 | 0 |
| 1 | 1 | 0 | 0 | 0 | 0 | 1 |
| 1 | 1 | 0 | 0 | 0 | 1 | 0 |
| 1 | 1 | 0 | 0 | 0 | 1 | 1 |
| 1 | 1 | 0 | 0 | 1 | 0 | 0 |
| 1 | 1 | 0 | 0 | 1 | 0 | 1 |
| 1 | 1 | 0 | 0 | 1 | 1 | 0 |
| 1 | 1 | 0 | 0 | 1 | 1 | 1 |
| 1 | 1 | 0 | 1 | 0 | 0 | 0 |
| 1 | 1 | 0 | 1 | 0 | 0 | 1 |
| 1 | 1 | 0 | 1 | 0 | 1 | 0 |
| 1 | 1 | 0 | 1 | 0 | 1 | 1 |
| 1 | 1 | 0 | 1 | 1 | 0 | 0 |
| 1 | 1 | 0 | 1 | 1 | 0 | 1 |
| 1 | 1 | 0 | 1 | 1 | 1 | 0 |
| 1 | 1 | 0 | 1 | 1 | 1 | 1 |
| 1 | 1 | 1 | 0 | 0 | 0 | 0 |
| 1 | 1 | 1 | 0 | 0 | 0 | 1 |
| 1 | 1 | 1 | 0 | 0 | 1 | 0 |
| 1 | 1 | 1 | 0 | 0 | 1 | 1 |
| 1 | 1 | 1 | 0 | 1 | 0 | 0 |
| 1 | 1 | 1 | 0 | 1 | 0 | 1 |
| 1 | 1 | 1 | 0 | 1 | 1 | 0 |
| 0 | 1 | 1 | 0 | 1 | 1 | 1 |
| 1 | 1 | 1 | 1 | 0 | 0 | 0 |
| 1 | 1 | 1 | 1 | 0 | 0 | 1 |
| 1 | 1 | 1 | 1 | 0 | 1 | 0 |
| 0 | 1 | 1 | 1 | 0 | 1 | 1 |
| 0 | 1 | 1 | 1 | 1 | 0 | 0 |
| 0 | 1 | 1 | 1 | 1 | 0 | 1 |
| 0 | 1 | 1 | 1 | 1 | 1 | 0 |
| 0 | 1 | 1 | 1 | 1 | 1 | 1 |

| $P_{16}$ | $z_{16}$ | $z_{15..13}$ | $z_{12}$ | $y_{12}$ | $y_{11..9}$ | $x_9$ |
|---|---|---|---|---|---|---|
| 0 | 0 | 0 | 0 | 0 | 0 | 0 |
| 0 | 0 | 0 | 0 | 0 | 0 | 1 |
| 0 | 0 | 0 | 0 | 0 | 1 | 0 |
| 0 | 0 | 0 | 0 | 0 | 1 | 1 |
| 0 | 0 | 0 | 0 | 1 | 0 | 0 |
| 0 | 0 | 0 | 0 | 1 | 0 | 1 |
| 0 | 0 | 0 | 0 | 1 | 1 | 0 |
| 0 | 0 | 0 | 0 | 1 | 1 | 1 |
| 0 | 0 | 0 | 1 | 0 | 0 | 0 |
| 0 | 0 | 0 | 1 | 0 | 0 | 1 |
| 0 | 0 | 0 | 1 | 0 | 1 | 0 |
| 0 | 0 | 0 | 1 | 0 | 1 | 1 |
| 0 | 0 | 0 | 1 | 1 | 0 | 0 |
| 0 | 0 | 0 | 1 | 1 | 0 | 1 |
| 0 | 0 | 0 | 1 | 1 | 1 | 0 |
| 0 | 0 | 0 | 1 | 1 | 1 | 1 |
| 0 | 0 | 1 | 0 | 0 | 0 | 0 |
| 0 | 0 | 1 | 0 | 0 | 0 | 1 |
| 0 | 0 | 1 | 0 | 0 | 1 | 0 |
| 0 | 0 | 1 | 0 | 0 | 1 | 1 |
| 0 | 0 | 1 | 0 | 1 | 0 | 0 |
| 0 | 0 | 1 | 0 | 1 | 0 | 1 |
| 0 | 0 | 1 | 0 | 1 | 1 | 0 |
| 1 | 0 | 1 | 0 | 1 | 1 | 1 |
| 0 | 0 | 1 | 1 | 0 | 0 | 0 |
| 0 | 0 | 1 | 1 | 0 | 0 | 1 |
| 0 | 0 | 1 | 1 | 0 | 1 | 0 |
| 1 | 0 | 1 | 1 | 0 | 1 | 1 |
| 1 | 0 | 1 | 1 | 1 | 0 | 0 |
| 1 | 0 | 1 | 1 | 1 | 0 | 1 |
| 1 | 0 | 1 | 1 | 1 | 1 | 0 |
| 1 | 0 | 1 | 1 | 1 | 1 | 1 |
| 1 | 1 | 0 | 0 | 0 | 0 | 0 |
| 1 | 1 | 0 | 0 | 0 | 0 | 1 |
| 1 | 1 | 0 | 0 | 0 | 1 | 0 |
| 1 | 1 | 0 | 0 | 0 | 1 | 1 |
| 1 | 1 | 0 | 0 | 1 | 0 | 0 |
| 1 | 1 | 0 | 0 | 1 | 0 | 1 |
| 1 | 1 | 0 | 0 | 1 | 1 | 0 |
| 1 | 1 | 0 | 0 | 1 | 1 | 1 |
| 1 | 1 | 0 | 1 | 0 | 0 | 0 |
| 1 | 1 | 0 | 1 | 0 | 0 | 1 |
| 1 | 1 | 0 | 1 | 0 | 1 | 0 |
| 1 | 1 | 0 | 1 | 0 | 1 | 1 |
| 1 | 1 | 0 | 1 | 1 | 0 | 0 |
| 1 | 1 | 0 | 1 | 1 | 0 | 1 |
| 1 | 1 | 0 | 1 | 1 | 1 | 0 |
| 1 | 1 | 0 | 1 | 1 | 1 | 1 |
| 1 | 1 | 1 | 0 | 0 | 0 | 0 |
| 1 | 1 | 1 | 0 | 0 | 0 | 1 |
| 1 | 1 | 1 | 0 | 0 | 1 | 0 |
| 1 | 1 | 1 | 0 | 0 | 1 | 1 |
| 1 | 1 | 1 | 0 | 1 | 0 | 0 |
| 1 | 1 | 1 | 0 | 1 | 0 | 1 |
| 1 | 1 | 1 | 0 | 1 | 1 | 0 |
| 0 | 1 | 1 | 0 | 1 | 1 | 1 |
| 1 | 1 | 1 | 1 | 0 | 0 | 0 |
| 1 | 1 | 1 | 1 | 0 | 0 | 1 |
| 0 | 1 | 1 | 1 | 0 | 1 | 0 |
| 0 | 1 | 1 | 1 | 0 | 1 | 1 |
| 0 | 1 | 1 | 1 | 1 | 0 | 0 |
| 0 | 1 | 1 | 1 | 1 | 0 | 1 |
| 0 | 1 | 1 | 1 | 1 | 1 | 0 |
| 0 | 1 | 1 | 1 | 1 | 1 | 1 |

| case | $z_1$ | $z_2$ | $z_3$ | $z_4$ |
|---|---|---|---|---|
| Fact 1 | 1 | 0 | 0 | 0 |
| Fact 2 | 0 | 0 | 0 | 0 |
| $g=^u001$ | 0 | 0 | 0 | 1 |
| $g=^u010$ | 0 | 0 | 1 | 0 |
| $g=^u011$ | 0 | 0 | 1 | 1 |
| $g=^u100$ | 0 | 1 | 0 | 0 |
| $g=^u101$ | 0 | 1 | 0 | 1 |
| $g=^u110$ | 0 | 1 | 1 | 0 |
| $g=^u111$ | 0 | 1 | 1 | 1 |

—1510

| case | $b_1$ | $b_2$ | $b_3$ |
|---|---|---|---|
| $0 \leq h \leq 2$ | 0 | 0 | 0 |
| $3 \leq h \leq 4$ | 0 | 0 | 1 |
| $5 \leq h \leq 6$ | 0 | 1 | 0 |
| $7 \leq h \leq 8$ | 0 | 1 | 1 |
| $9 \leq h \leq 10$ | 1 | 0 | 0 |
| $11 \leq h \leq 12$ | 1 | 0 | 1 |
| $13 \leq h \leq 14$ | 1 | 1 | 0 |
| $15 \leq h \leq 63$ | 1 | 1 | 1 |

FIXED VALUE MULTIPLICATION USING FIELD-PROGRAMMABLE GATE ARRAY

BACKGROUND

The present invention relates to computing technology, and particularly to improvement to a fixed-value multiplier used by computing systems, where the improvement is achieved by using a field-programmable gate array (FPGA).

An FPGA is an integrated circuit designed to be configured by a customer or a designer after manufacturing. The FPGA configuration is generally specified using a hardware description language (HDL), similar to that used for an application-specific integrated circuit (ASIC). Computing a multiplication of two numbers is a common operation performed by various computing systems. Several computing systems require a multiplication in which one of the values is known or fixed, and the second is a dynamic input value.

SUMMARY

According to one or more embodiments of the present invention, a method for multiplying two binary numbers includes configuring, in an integrated circuit, a plurality of lookup tables based on a known binary number (w). The lookup tables can be configured in three layers. The method further includes receiving, by the integrated circuit, an input binary number (d). The method further includes determining, by the integrated circuit, a multiplication result (p) of the known binary number w and the input binary number d by determining each bit ($p_i$) from p using the lookup tables based on specific combination of bits from the known binary number w and from the input binary number d, wherein a notation $j_x$ represents the $x^{th}$ bit of j from the right, with bit $j_0$ being the rightmost bit of j.

In one or more embodiments of the present invention, the known binary number w has a predetermined number of bits. For example, the known binary number is an 8-bit binary number. Further, in one or more embodiments of the present invention, the input binary number has a predetermined number of bits. For example, the input binary number is a 12-bit binary number.

In one or more embodiments of the present invention, the bits $p_5$, $p_4$, $p_3$, $p_2$, $p_1$, and $p_0$ of p are determined by a first circuit that includes a first layer of the lookup tables from the integrated circuit based on the bits $d_5$, $d_4$, $d_3$, $d_2$, $d_1$, and $d_0$ of the input binary number d. Further, the bits $p_8$, $p_7$, and $p_6$, of p are determined by a second circuit from the integrated circuit based on the first set of auxiliary bits computed by the first circuit. The second circuit includes a second layer of the lookup tables. Further yet, the bits $p_{16}$, $p_{15}$, $p_{14}$, $p_{13}$, $p_{12}$, $p_{11}$, and $p_{10}$ of p are determined by a third circuit from the integrated circuit based on auxiliary bits computed by the second circuit. The third circuit includes a third layer of the lookup tables. In one or more embodiments of the present invention, determining the bit $p_{19}$ of p includes determining, using a subset of lookup tables, that t≤d, wherein t=$\lceil 2^{19}/w \rceil$ is precomputed, and in response to t≤d, $p_{19}$ is set to 1, and otherwise $p_{19}$ is set to 0.

In one or more embodiments of the present invention, determining the bit $p_{18}$ of p includes precomputing threshold values $t_{01}$, $t_{10}$, and $t_{11}$:

$$t_{01} = \lceil 2^{18}/w \rceil,$$

$$t_{10} = \lfloor (2^{19}-1)/w \rfloor, \text{ and}$$

$$t_{11} = \lceil (2^{19}+2^{18})/w \rceil.$$

In response to ($t_{11} \leq d$) or ($t_{01} \leq d \leq t_{10}$), $p_{18}$ is set to 1, and otherwise to 0.

Further, in one or more embodiments of the present invention, determining the bit $p_{17}$ of p includes precomputing threshold values:

$$t_{001} = \lceil 2^{17}/w \rceil,$$

$$t_{010} = \lfloor (2^{18}-1)/w \rfloor,$$

$$t_{011} = \lceil (2^{18}+2^{17})/w \rceil,$$

$$t_{100} = \lfloor (2^{19}-1)/w \rfloor,$$

$$t_{101} = \lceil (2^{19}+2^{17})/w \rceil,$$

$$t_{110} = \lfloor (2^{19}+2^{18}-1)/w \rfloor, \text{ and}$$

$$t_{111} = \lceil (2^{19}+2^{18}+2^{17})/w \rceil.$$

$P_{17}$ is set to 1 in response to $t_{111} \leq d$, $t_{101} \leq d \leq t_{110}$, $t_{011} \leq d \leq t_{100}$, and $t_{001} \leq d \leq t_{010}$, and to 0 otherwise.

The technical solutions described herein can also be achieved by implementing a system that includes a memory device that stores a known binary number (w), and a multiplication circuit that performs the method to determine the multiplication result (p) of the known binary number with an input binary number (d) that is received dynamically.

Alternatively, in one or more embodiments of the present invention, a neural network system includes a multiplication circuit for performing a method to determine a multiplication result of a weight value with an input value (d) that is received dynamically, the method including configuring several lookup tables in an integrated circuit based on the weight value (w) that is a known value. The lookup tables can be configured in three layers. The method further includes determining a multiplication result (p) of the weight value w and the input value d by determining each bit ($p_i$) from p using the lookup tables based on a specific combination of bits from the weight value w and from the input value d, wherein a notation $j_x$ represents the $x^{th}$ bit of j from the right, with bit $j_0$ being the rightmost bit of j.

In yet another embodiment of the present invention, an electronic circuit determines a multiplication result (p) of a weight value (w) and an input value (d) that is received dynamically. Determining the multiplication result includes configuring several lookup tables based on the weight value (w), and determining each respective bit ($p_i$) of the multiplication result (p) using the lookup tables based on specific combination of bits from the weight value w and from the input value d. The notation $j_x$ represents the $x^{th}$ bit of j from the right, with bit $j_0$ being the rightmost bit of j.

In another embodiment of the present invention, a field programmable gate array includes several lookup tables, wherein the field programmable gate array performs a method for determining a multiplication result (p) of a weight value (w) and an input value (d) that is received dynamically. The lookup tables can be configured in three layers.

Embodiments of the present invention can include various other implementations such as machines, devices, and apparatus.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8 depicts a lookup table used in a multiplication circuit according to one or more embodiments of the present invention;

FIG. 9 depicts several lookup tables used in a multiplication circuit according to one or more embodiments of the present invention;

FIG. 10 depicts a lookup table used in a multiplication circuit according to one or more embodiments of the present invention;

FIG. 11 depicts a lookup table used in a multiplication circuit according to one or more embodiments of the present invention;

FIG. 12 depicts a lookup table used in a multiplication circuit according to one or more embodiments of the present invention;

FIG. 15 depicts several lookup tables used in a multiplication circuit according to one or more embodiments of the present invention;

Figure 1:
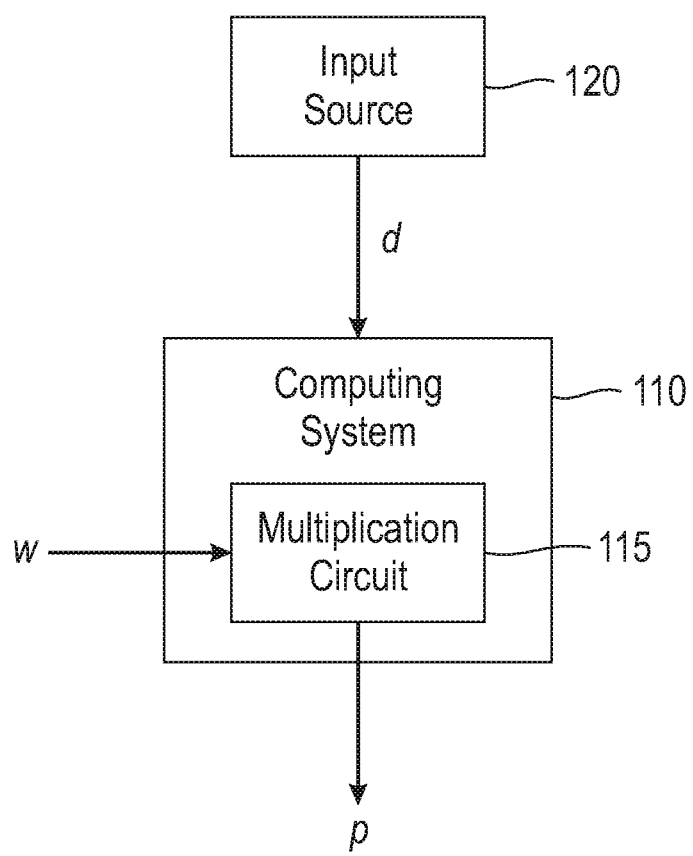
FIG. 1 depicts a block diagram of a system that uses a multiplication circuit according to one or more embodiments of the present invention.

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describe having a communications path between two elements and do not imply a direct connection between the elements with no intervening elements/connections between them. All of these variations are considered a part of the specification.

DETAILED DESCRIPTION

Exemplary embodiments of the present invention provide improved efficiency for computing a multiplication in computing systems, particularly in the case where one of the values to be multiplied is a fixed (known) value, and the second value to be multiplied is dynamically input. Exemplary embodiments of the present invention provide a multiplication circuit for performing such a computation efficiently. The values are represented in digital format using binary numbers. In one or more embodiments of the present invention, a field-programmable gate array (FPGA) includes a plurality of lookup tables (LUTs), the LUTs being configured in n layers to realize the multiplication circuit.

As a brief introduction, FPGAs typically contain an array of programmable logic blocks and a hierarchy of reconfigurable interconnects that allow the blocks to be "wired together," like several logic gates that can be coupled together in different configurations. Logic blocks can be configured to perform combinational functions, logic gates like AND and XOR, and other functions. The logic blocks also include memory elements, such as flip-flops or more complete blocks of memory. It should be noted that FPGAs can include components different from those described herein; the above is an exemplary FPGA.

A technical challenge with computing systems is improving the time required for the computing system to perform calculations such as multiplication of numbers represented as binary numbers. Technical solutions provided by embodiments of the present invention address such technical challenges by providing an n layered multiplication circuit that performs a multiplication in deterministic time for two binary numbers—one fixed-value number and one variable number that is input at runtime. One or more embodiments of the present invention use FPGAs to implement the multiplication circuit using LUTs. As used herein, a "k-to-1 Boolean function" is implemented as a k-input LUT that provides a 1-bit output given a k-bit input.

Further, the present document denotes $B=\{0,1\}$, $B^n$ is the set of all n-tuples of zeros and ones, and $B_n$ is the set of all Boolean functions $B^n \rightarrow B$. Also, the present document uses the same symbol x interchangeably to denote both a Boolean vector $x=(x_0, \ldots, x_{k-1})\in B^k$ and a natural number $$x = \sum_{i=0}^{k-1} x_i 2^k.$$

The operation of the addition of two Boolean vectors, including two Boolean scalars, is denoted without confusion by the same '+' sign. Accordingly, the technical challenge restated using the terminology just established is to compute the product of an input value d and a fixed-value weight w.

FIG. 1 depicts a block diagram of a system for computing a fixed-value binary number multiplication according to one or more embodiments of the present invention. For example, the multiplication circuit 115 that is described herein can be a part of a computing system 110 that receives an input-value (d) from an input source 120. The multiplication circuit 115 calculates an output p of a product of d with a known fixed value w.

In one or more embodiments of the present invention, the computing system 110 can be an artificial neural network system. Alternatively, the computing system 110 is a desktop computer, a server computer, a tablet computer, or any other type of computing device that uses the multiplication circuit 115 to compute a product of two binary numbers, one of which has a known value (w).

In one or more embodiments of the present invention, the input source 120 can be a memory, a storage device, from which the input-value is provided to the multiplication circuit 115. Alternatively, or in addition, the input-value can be input to the multiplication circuit 115 directly upon acquisition, for example, the input source 120 is a sensor, such as a camera, an audio input device, or any other type of sensor that captures data in a form that can be input to the multiplication circuit 115.

Figure 2:
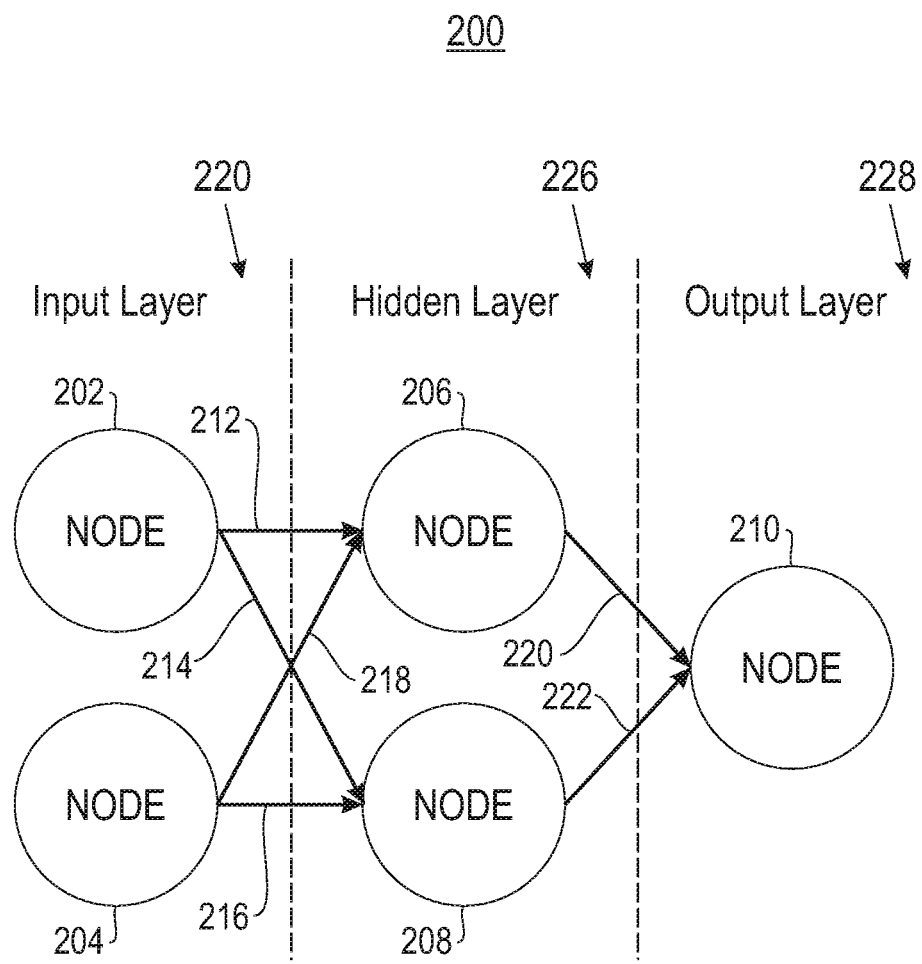
FIG. 2 depicts an exemplary neural network system according to one or more embodiments of the present invention.

FIG. 2 illustrates an example, non-limiting neural network system for which efficiency can be facilitated in accordance with one or more embodiments of the invention. The neurons of a neural network 200 can be connected so that the output of one neuron can serve as an input to another neuron. Neurons within a neural network can be organized into layers, as shown in FIG. 2. The first layer of a neural network can be called the input layer (224), the last layer of a neural network can be called the output layer (228), and any intervening layers of a neural network can be called a hidden layer (226). Aspects of systems (e.g., system 200 and the like), apparatuses, or processes explained herein can constitute machine-executable component(s) embodied within machine(s), e.g., embodied in one or more computer-readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in respective embodiments is omitted for the sake of brevity.

The system 200 and/or the components of the system 200 can be employed to use hardware and/or software to solve problems that are highly technical in nature, that are not abstract and that cannot be performed as a set of mental acts by a human. For example, system 200 and/or the components of the system 200 can be employed to use hardware and/or software to perform operations, including facilitating an efficiency within a neural network. Furthermore, some of the processes performed can be performed by specialized computers for carrying out defined tasks related to facilitating efficiency within a neural network. System 200 and/or components of the system 200 can be employed to solve new problems that arise through advancements in technology, computer networks, the Internet, and the like. System 200 can further provide technical improvements to live and Internet-based learning systems by improving processing efficiency among processing components associated with facilitating efficiency within a neural network.

System 200, as depicted in FIG. 2, is a neural network that includes five neurons—neuron 202, neuron 204, neuron 206, neuron 208, and neuron 210. The input layer 224 of this neural network is comprised of neuron 202 and neuron 204. The hidden layer 226 of this neural network is comprised of neuron 206 and neuron 208. The output layer 228 of this neural network is comprised of neuron 210. Each of the neurons of input layer 224 is connected to each of the neurons of hidden layer 226. That is, a possibly-weighted output of each neuron of input layer 224 is used as an input to each neuron of hidden layer 226. Then, each of the neurons of hidden layer 226 is connected to each of the neurons (here, one neuron) of output layer 228.

The neural network of system 200 presents a simplified example so that certain features can be emphasized for clarity. It can be appreciated that the present techniques can be applied to other neural networks, including ones that are significantly more complex than the neural network of system 200.

In the context of artificial neural networks, each of the neurons performs a computation, for example, during various phases, such as forward propagation, backward propagation, and weight update. Such computations can include multiplication. In one or more embodiments of the present invention, the computations include multiplication of a weight-value assigned to the neuron (which is a known and fixed value), and an input value (which can be variable). Here, the "weight-value" represents the weight that is assigned to a neuron in the neural network 200, and the "input-value" is a value received by that neuron to calculate the output. The calculation can be performed during the training of the neural network or during inference using the neural network. In one or more embodiments of the present invention, the calculation can be performed during any phase of the training, forward propagation, backward propagation, weight update, or any other phase. The performance of the neural network 200 can be improved if the efficiency of the multiplication operation can be improved. One or more embodiments of the present invention facilitate a faster way of calculating a multiplication of an input-value (d) with the weight-value (w). Further, one or more embodiments of the present invention facilitate hardware components to support such calculation using LUTs.

It is noted that although FIG. 2 depicts an embodiment of the present invention with the computing system 110 as a neural network system (200), in one or more embodiments of the present invention, the computing system 110 can be other types of computing systems that include the multiplication circuit 115.

The technical solutions provided by one or more embodiments of the present invention are now described using an exemplary case where w is an 8-bit value, and d is a 12-bit value. It is understood that in other embodiments of the present invention, the values can have a different number of bits. However, for explaining the operation of the technical solutions of the present invention, the above example scenario is chosen. Accordingly, the computational problem is defined by a fixed nonzero weight-value, which is a vector of bit-values $w=(w_0, \ldots, w_7) \in B^8$, so $$w = \sum_{i=0}^{7} w_i 2^i.$$

The input-value is a vector of bit-values $d=(d_0, \ldots, d_{11}) \in B^{12}$, so $$d = \sum_{i=0}^{11} d_i 2^i.$$

The input-value d can also be represented as $d=g \cdot 2^6 + h$, where g and h are integers such that $0 \le g, h < 2^6$. Accordingly, $$g = \left\lfloor \frac{d}{2^6} \right\rfloor$$

and $h = d - g \cdot 2^6$.

In this case, p is a vector of bit-values such that $p = (p_0, \ldots, p_{19}) \in B^{20}$, so $$p = \sum_{i=0}^{19} p_i 2^i,$$

and hence, $0 \leq p \leq 2^{20} - 1$. In this document, a function is denoted $P_i(d) = P_i(d; w)$, where the function returns $p_i$, $i = 0, \ldots, 19$.

Now, if n is any natural number, and if g is an n-to-1 Boolean function, and if $f_1, \ldots, f_n$ are n 6-to-1 Boolean functions, the composition $h(x) = g(f_1,(x), \ldots, f_n(x))$ is also a 6-to-1 Boolean function. Further, let $x = \{0, \ldots, 2^6-1\}$ and let $y = x+1$, where x and y are Boolean vectors. For $i = 0, \ldots, 5$:

$$J_i(x) \begin{cases} 1 & \text{if } x_j = 1 \text{ for } j = 0, 1, \ldots, i \\ 0 & \text{otherwise} \end{cases} \quad (1)$$

Under these conditions, for $i = 0, \ldots, 5$, $y_i = x_i$ if and only if $J_i(x) = 0$, and $y_6 = 1$ if and only if $J_5(x) = 1$.

It can be proven that for every natural $n \in \mathbb{N}$, there exists a 2-level circuit of 6-to-1 Boolean functions, where the circuit decides for every $d \in B^{12}$ whether or not $d < n$. If $n \geq 2^{12}$, then because $d < 2^{12}$, the problem is trivial. Hence, consider that $n < 2^{12}$. In this case, the number n can be uniquely represented as $n = a \cdot 2^6 + b$, where a and b are integers such that $0 \leq a, b < 2^6$. Here, $d < n$ if and only if either (i) $g < a$, or (ii) $g = a$ and $h < b$. Defining the following functions:

$$G(d) = G(g) = \begin{cases} 1 & \text{if } g < a \\ 0 & \text{if } g \geq a \end{cases}$$

$$E(d) = E(g) = \begin{cases} 1 & \text{if } g = a \\ 0 & \text{if } g \neq a \end{cases}$$

and $$H(d) = H(h) = \begin{cases} 1 & \text{if } h < b \\ 0 & \text{if } h \geq b \end{cases}$$

Each of these functions is a 6-to-1 Boolean function. It should be noted that although $d \in B^{12}$ each of these functions operates on only six bits of d. Let $J: B^3 \rightarrow B$ be the following:

$$J(x_1, x_2, x_3) = \begin{cases} 1 & \text{if } x_1 = 1 \\ 1 & \text{if } x_2 = 1 \text{ and } x_3 = 1 \\ 0 & \text{if } x_2 = 1 \text{ and } x_3 = 0 \\ 0 & \text{if } x_1 = 0 \text{ and } x_2 = 0 \end{cases}.$$

It follows that $d < n \Leftrightarrow J[G(d), E(d), H(d)] = 1$.

Accordingly, to improve the operation of the computing system 110, the multiplication circuit 115 has to be a circuit of FPGAs of minimum possible depth (i.e., number of layers) so that given a fixed weight-value w, the LUTs can be programmed for calculating the product w×d for any input $d \in B^{12}$:

| | | | | $d_{11}$ | $d_{10}$ | $d_9$ | $d_8$ | $d_7$ | $d_6$ | $d_5$ | $d_4$ | $d_3$ | $d_2$ | $d_1$ | $d_0$ |
|---|---|---|---|---|---|---|---|---|---|---|---|---|---|---|---|
| | | | × | | | | | $w_7$ | $w_6$ | $w_5$ | $w_4$ | $w_3$ | $w_2$ | $w_1$ | $w_0$ |
| $p_{19}$ | $p_{18}$ | $p_{17}$ | $p_{16}$ | $p_{15}$ | $p_{14}$ | $p_{13}$ | $p_{12}$ | $p_{11}$ | $p_{10}$ | $p_9$ | $p_8$ | $p_7$ | $p_6$ | $p_5$ | $p_4$ | $p_3$ | $p_2$ | $p_1$ | $p_0$ |

Here, each of the $d_i$, $w_i$, and $p_i$ is a bit-value.

Figure 3:
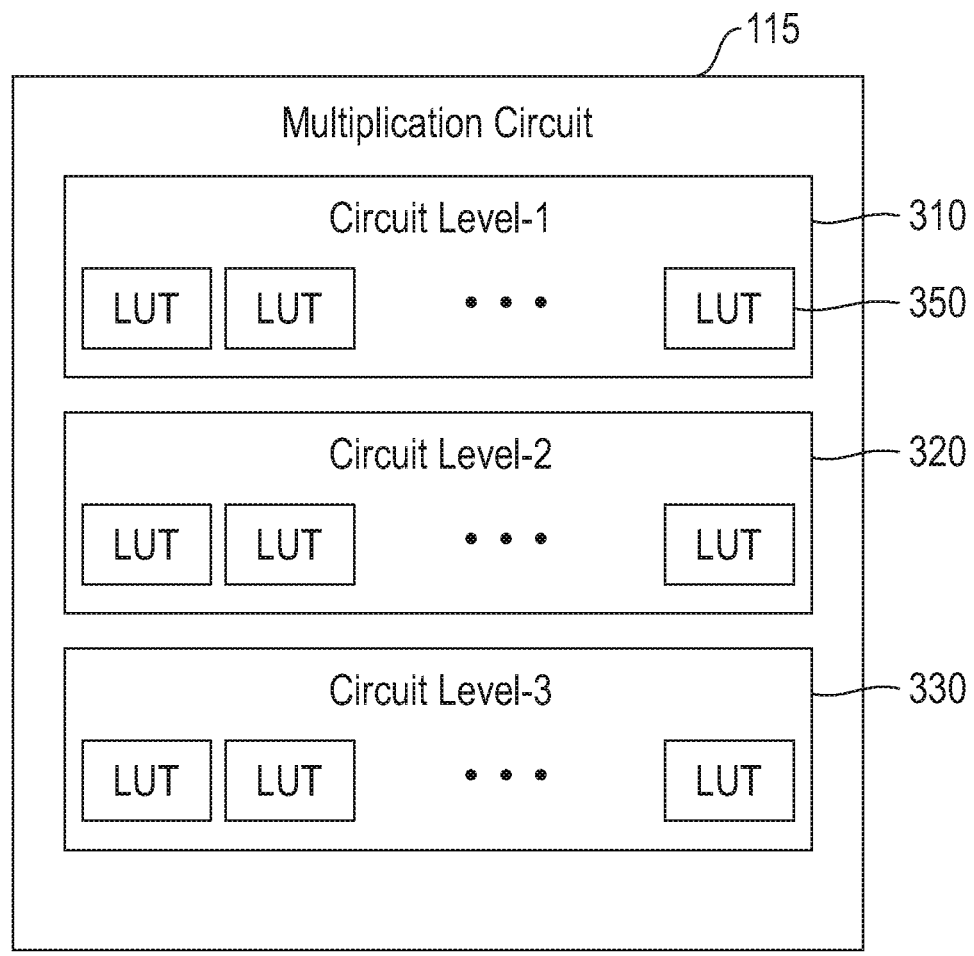
FIG. 3 depicts a block diagram of a multiplication circuit according to one or more embodiments of the present invention.

FIG. 3 depicts a block diagram of the multiplication circuit according to one or more embodiments of the present invention. The multiplication circuit 115 can be an FPGA in one or more embodiments of the present invention. Alternatively, or in addition, the multiplication circuit 115 can be an application-specific integrated circuit (ASIC), or any other type of electronic circuit that includes transistors, flip-flops, and other such components to implement lookup tables. The multiplication circuit 115, for this particular case of 8-bit 14) and 12-bit d, includes three levels, a first circuit 310, a second circuit 320, and a third circuit 330, each level being a separate circuit. Here, each circuit can be a collection of LUTs implemented by the FPGA. In the case where the w and/or the d has/have a different number of bits, the number of levels in the multiplication circuit 115 can change. The circuits (310, 320, and 330) can communicate auxiliary bit-values among each other to facilitate calculations to be efficient. The circuits (310, 320, and 330) include several LUTs 350 to provide an output based on the input-value d. The LUTs 350 are configured based on the weight-value iv, which is a known value.

Figure 4:
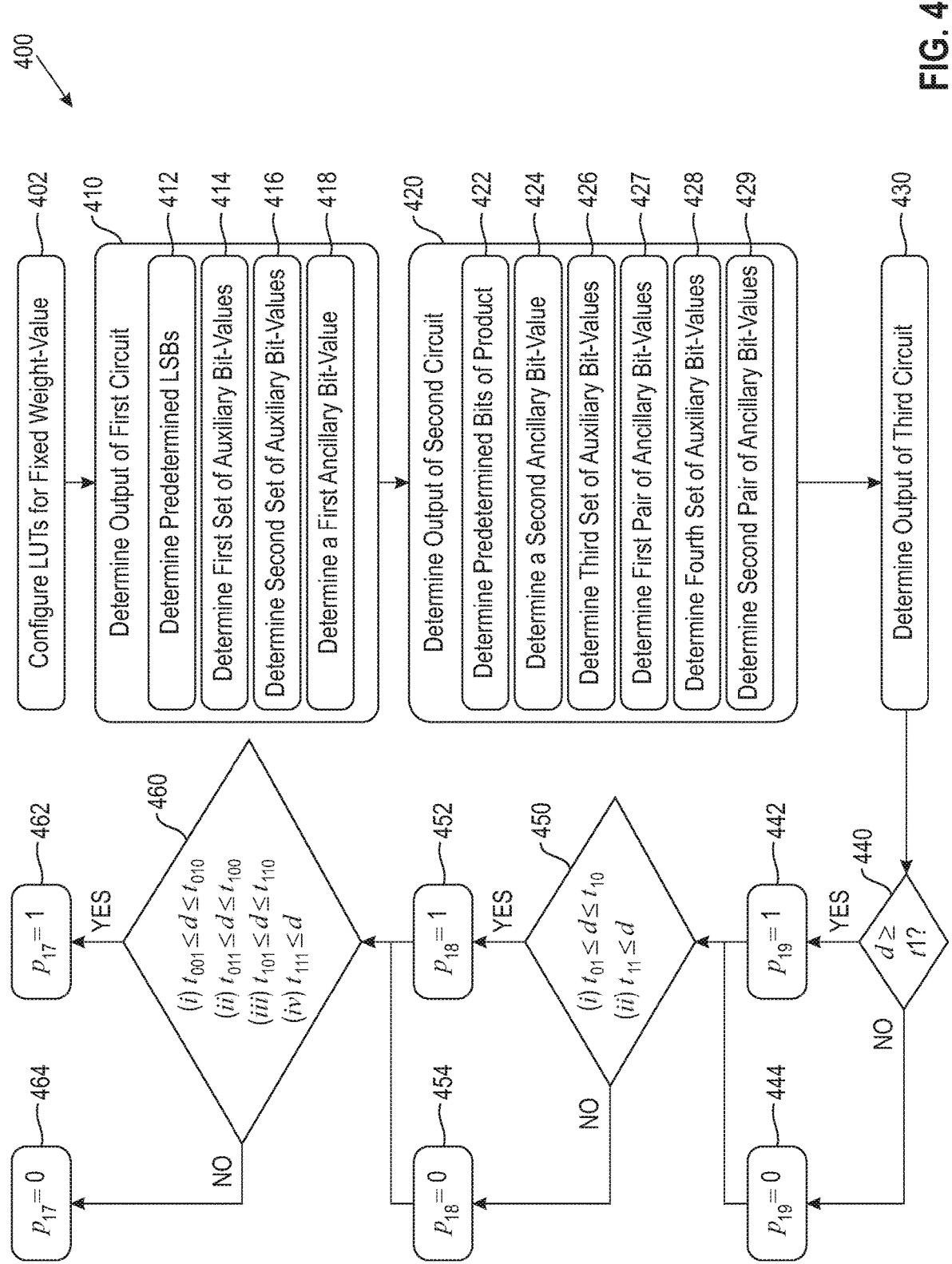
FIG. 4 depicts a flowchart of a method for determining a multiplication result of a known value, w, with input value, d, according to one or more embodiments of the present invention.
Figure 5:
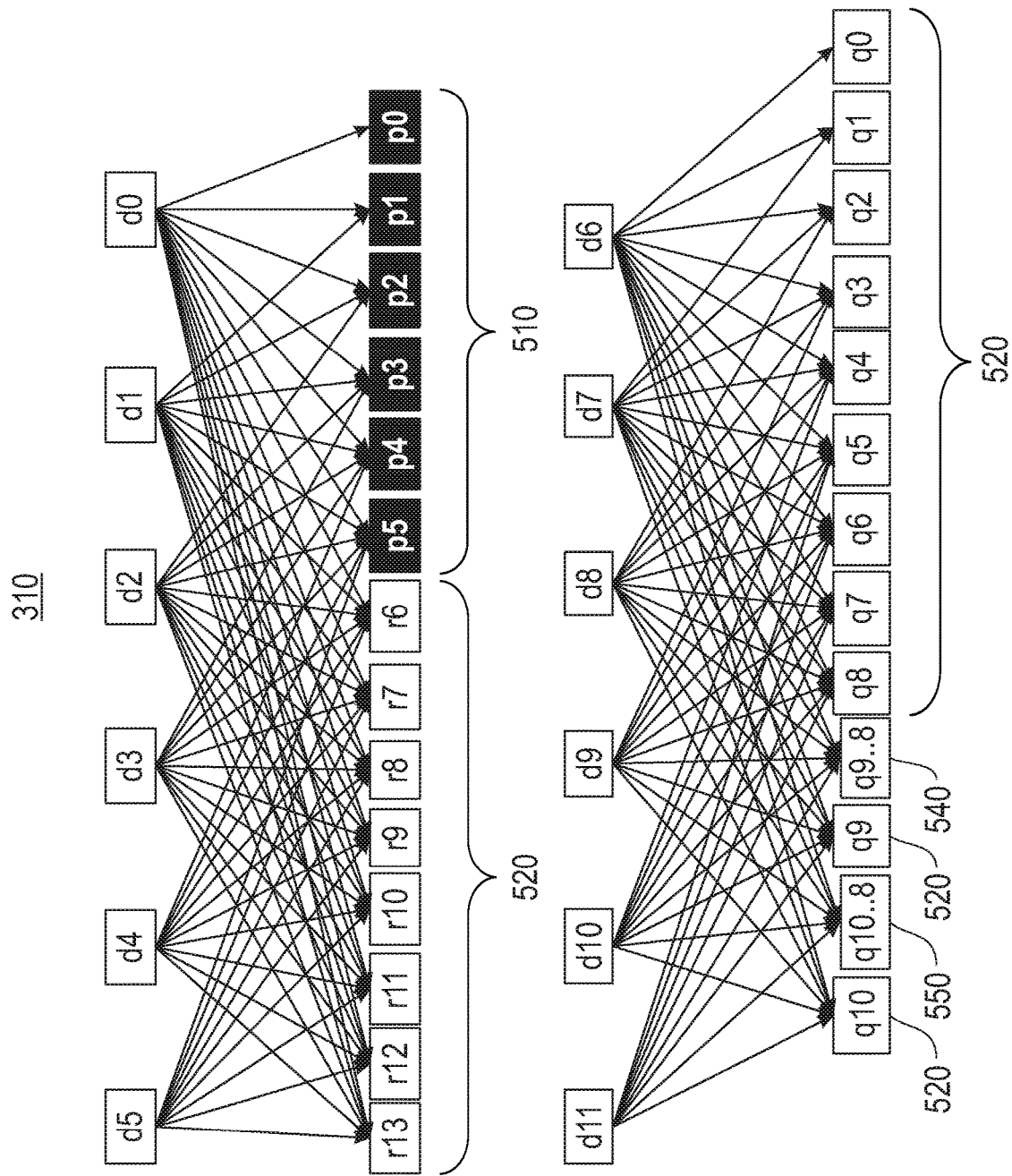
FIG. 5 depicts a first circuit used in a multiplication circuit according to one or more embodiments of the present invention.
Figure 6:
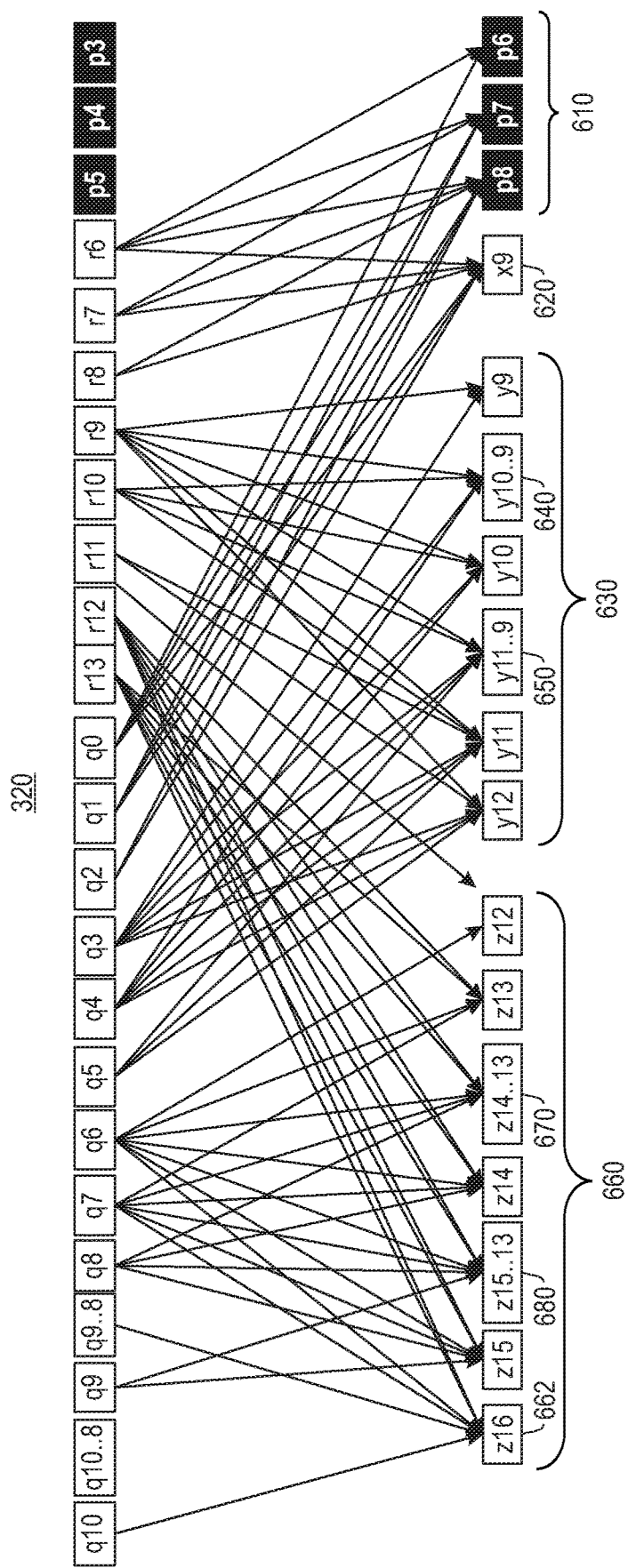
FIG. 6 depicts a second circuit used in a multiplication circuit according to one or more embodiments of the present invention.
Figure 7:
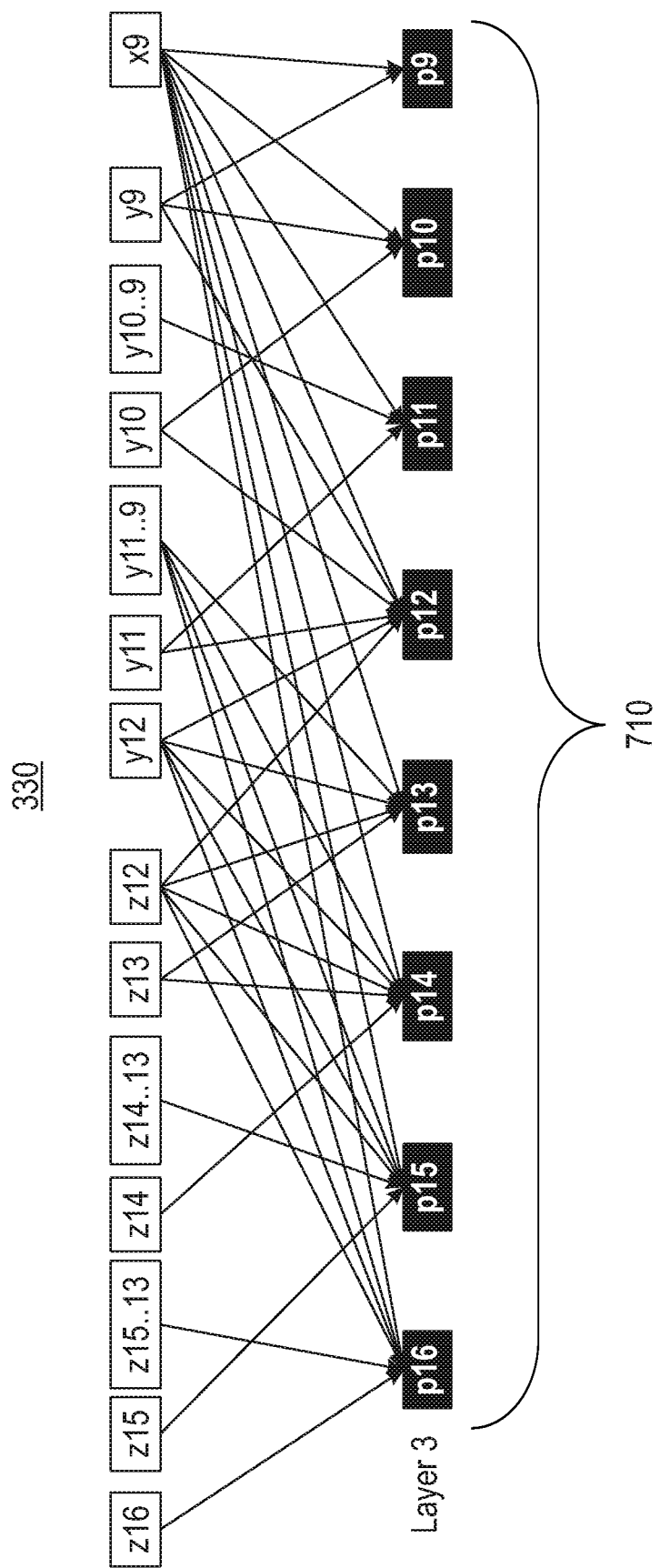
FIG. 7 depicts a third circuit used in a multiplication circuit according to one or more embodiments of the present invention.

FIG. 4 depicts a flowchart of a method for computing the product p of the input-value d and the weight-value))) according to one or more embodiments of the present invention. FIG. 5, FIG. 6, and FIG. 7, each depicts a block diagram of the first circuit 310, the second circuit 320, and the third circuit 330, respectively, according to one or more embodiments of the present invention.

The method 400 includes configuring the several LUTs 350 in the multiplier circuit 115 based on the weight-value iv, at block 402. Each LUT 350 provides an output bit based on a set of input bits. The input bits to the LUT 350 can include one or more bit-values from d. In addition, the input bits to the LUT 350 can include one or more auxiliary bit-values output by another LUT 350. In one or more cases, the auxiliary bit-values from the first circuit 310 are used as input bits to one or more LUTs 350 in the other circuits (320 and 330). Similarly, auxiliary bits from the second circuit 320 can be used as input bits to LUTs 350 of the third circuit 330.

The method 400 includes determining an output of the first circuit 310, at block 410. Part of the output from the first circuit 310 includes a predetermined number of LSBs 510 of p, at block 412. As shown in FIG. 5, in the case with the 12-bit d and 8-bit w, the first circuit 310 computes the first 6-bits of p ($p_0$ to $p_5$). The first circuit 310 further determines a first set of auxiliary bit-values ($r_6$ to $r_{13}$) 520 that is used as input bit-values to other LUTs 350 from the multiplication circuit 115, at block 414. The LSBs 510 and the first set of auxiliary bit-values 520 are both determined based on the six LSBs of d ($d_0$ to $d_5$). The computation of the LSBs 510 and the first set of auxiliary bit-values 520 can be expressed as:

$$\begin{array}{rrrrrrrrr} & & d_5 & d_4 & d_3 & d_2 & d_1 & d_0 & (2)\\ \times & & w_7 & w_6 & w_5 & w_4 & w_3 & w_2 & w_1 & w_0\\ \hline = r_{13} & r_{12} & r_{11} & r_{10} & r_9 & r_8 & r_7 & r_6 & p_5 & p_4 & p_3 & p_2 & p_1 & p_0 \end{array}$$

Further, the first circuit 310 determines a second set of auxiliary bit-values ($q_0$ to $q_{13}$) 530 that is used as input bit-values to other LUTs 350 from the multiplication circuit 115, at block 416. The second set of auxiliary bit-values 520 is determined based on the six most significant bits (MSBs) of d ($d_6$ to $d_{11}$). The computation of the second set of auxiliary bit-values 530 can be expressed as:

$$\begin{array}{rrrrrrrrr} & & d_{11} & d_{10} & d_9 & d_8 & d_7 & d_6 & (3)\\ \times & & w_7 & w_6 & w_5 & w_4 & w_3 & w_2 & w_1 & w_0\\ \hline = q_{13} & q_{12} & q_{11} & q_{10} & q_9 & q_8 & q_7 & q_6 & q_5 & q_4 & q_3 & q_2 & q_1 & q_0 \end{array}$$

In addition, the first circuit 310 determines a first ancillary bit-value ($q_{9\ldots 8}$) 540, at block 418. The first ancillary bit-value is communicated to the second circuit 320 and represents:

Further, referring to the flowchart in FIG. 4, method 400 includes determining the output bit-values of the second circuit 320, at block 420. Part of the output of the second circuit 320 includes a predetermined number of bits 610 of p, at block 422. As shown in FIG. 6, in the case with the 12-bit d and 8-bit w, the second circuit 320 computes $p_6$ to $p_8$ (610). The second circuit 320 further determines a second ancillary bit-value ($x_9$) 620 that is used as input bit-values to other LUTs 350 from the multiplication circuit 115, at block 424. The bit-values 610 and the second ancillary bit-value 620 are both determined based on subsets of the first set of auxiliary bit-values 520 and the second set of auxiliary bit-values 530 ($r_8$, $r_7$, $r_6$, and $q_2$, $q_1$, $q_0$). The computation can be expressed as:

$$\begin{array}{rrrr} & r_8 & r_7 & r_6 & (4)\\ + & q_2 & q_1 & q_0\\ \hline = x_9 & p_8 & p_7 & p_6 \end{array}$$

Further, the second circuit 320 determines a third set of auxiliary bit-values ($y_9$ to $y_{12}$) 630, at block 426. The third set of auxiliary bit-values is determined using subsets of the first set of auxiliary bit-values 520 and the second set of auxiliary bit-values 530 ($r_{11}$, $r_{10}$, $r_9$, and $q_5$, $q_4$, $q_3$). The computation can be expressed as:

$$\begin{array}{rrrr} & r_{11} & r_{10} & r_9 & (5)\\ + & q_5 & q_4 & q_3\\ \hline = y_{12} & y_{11} & y_{10} & y_9 \end{array}$$

The second circuit 320 further determines a third ancillary bit-value ($y_{10\ldots 8}$) 640 and a fourth ancillary value ($y_{11\ldots 9}$) 650, at block 427. The ancillary bit-values are used by the third circuit 330. In one or more embodiments of the present invention, the third ancillary bit-value ($y_{10\ldots 8}$) 640 and the fourth ancillary value ($y_{11\ldots 9}$) 650 are part of the third set of auxiliary values 630. The ancillary bit-values represent a combination of one or more bit-values from the third set of auxiliary bit-values, and the computation can be expressed as:

$$y_{10\ldots 9} = y_{10} \wedge y_9$$

$$y_{11\ldots 9} = y_{111} \wedge y_{10} \wedge y_9 \qquad (6)$$

Further, the second circuit 320, using ($r_{13}$, $r_{12}$, and $q_{10}$, $q_9$, $q_8$, $q_7$, $q_6$), determines a fourth set of auxiliary bit-values ($z_{16}$ to $z_{12}$) 660, at block 428. The computation can be expressed as:

$$\begin{array}{rrrrr} 0 & 0 & 0 & r_{13} & r_{12} & (7)\\ + q_{10} & q_9 & q_8 & q_7 & q_6\\ \hline = z_{16} & z_{15} & z_{14} & z_{13} & z_{12} \end{array}$$

Further yet, the second circuit 320 further determines a fifth ancillary bit-value ($z_{14\ldots 13}$) 670 and a sixth ancillary value ($z_{15\ldots 13}$) 680, at block 429. The computation of the ancillary bit-values can be expressed as:

$$z_{14\ldots 13} = z_{14} \wedge z_{13} \qquad (8)$$

$$z_{15\ldots 13} = z_{15} \wedge z_{14} \wedge z_{13}. \qquad (9)$$

Additionally, the bit-value $z_{16}$ 662 represents the combination:

$$z_{10} = q_{10} \otimes ((q_9 \wedge q_8) \wedge ((r_{13} \wedge q_7) \vee (r_{13} \wedge r^{12} \wedge q_6) \vee (q_7 \wedge r_{12} \wedge q_6))), \qquad (10)$$

Here, $a \otimes b = (a \wedge \neg b) \vee (\neg a \wedge b)$. This implies that $q_9$ can be replaced by $q_{9\ldots 8} = q_9 \wedge q_8$ for the computation of $z_{16}$. Accordingly, $z_{16}$ 662 can be obtained as a function of six input bit-values ($r_{13}$, $r_{12}$, and $q_{10}$, $q_{9\ldots 8}$, $q_7$, $q_6$) to a LUT 350. FIG. 8 depicts the LUT 350 for obtaining $z_{16}$ 662.

Referring back to FIG. 4, the method 400 further includes determining the remaining bit-values (MSBs) 710 of the product p using the third circuit 330, at block 430. Determining the MSBs 710 includes using several combinations of the input bit-values of d, the sets of auxiliary bit-values, and the several ancillary bit-values computed by the first circuit 310 and the second circuit 320.

The bit $p_9$ is determined using bits ($y_9$, $x_9$) based on:

$$p_9 \equiv p_9(y_9, x_9) = (y_9 + x_9)(\mathrm{mod}\ 2)$$

The corresponding LUT 350 is depicted in view 910 of FIG. 9 to determine $p_9$ based on the input bit-values.

The bit $p_{10}$ is determined using bits ($y_{10}$, $y_9$, $x_9$) based on:

$$P_{10} \equiv p_{10}(y_{10}, y_9, x_9) = \begin{cases} y_{10} & \text{if } (y_9, x_9) \neq (1,1)\\ 1 - y_{10} & \text{if } (y_9, x_9) = (1,1) \end{cases}$$

The corresponding LUT 350 is depicted in view 920 of FIG. 9 to determine $p_{10}$ based on the input bit-values.

The bit $p_{11}$ is determined using bits $(y_{11}, y_{10}, y_9, x_9)$ based on:

$$P_{11} \equiv p_{11}(y_{11}, y_{10}, y_9, x_9) = \begin{cases} y_{11} & \text{if } (y_{10}, y_9, x_9) \neq (1, 1, 1) \\ 1 - y_{11} & \text{if } (y_{10}, y_9, x_9) = (1, 1, 1) \end{cases}.$$

The dependence of $p_{11}$ on $y_{10}$ and $y_9$ is only to check whether or not $(y_{10}, y_9) = (1, 1)$. Hence, $y_{10}$ and $y_9$ can be replaced by the third ancillary bit 640 ($y_{10\ldots 9}$). The corresponding LUT 350 is depicted in view 930 of FIG. 9 to determine pH based on such input bit-values.

Calculating $p_{12}$ requires computing the addition:

$$\begin{array}{cccccc} & 0 & y_{12} & 0 & 0 & x_9 \\ + & 0 & z_{12} & y_{11} & y_{10} & y_9 \\ \hline = & c_{13} & p_{12} & p_{11} & p_{10} & p_9, \end{array}$$

where $c_{13}$ is not used, and $p_9$, $p_{10}$, and $p_{11}$, are determined as described earlier. Here, the dependence of $p_{12}$ on $y_{11}, y_{10}$, and $y_9$ is only to check whether or not $(y_{11}, y_{10}, y_9) = (1, 1, 1)$. Hence, $y_{11}, y_{10}$, and $y_9$ can be replaced by the fourth ancillary bit 650 ($y_{11\ldots 9}$). The corresponding LUT 350 is depicted in view 940 of FIG. 9 to determine $p_{12}$ based on such input bit-values.

Calculating $p_{13}$ requires computing the addition:

$$\begin{array}{ccccccc} & 0 & 0 & y_{12} & 0 & 0 & x_9 \\ + & 0 & z_{13} & z_{12} & y_{11} & y_{10} & y_9 \\ \hline = & c_{13} & p_{13} & p_{12} & p_{11} & p_{10} & p_9 \end{array}$$

where $c_{14}$ is not used, and $p_9$, $p_{10}$, $p_{11}$, and $p_{12}$, are determined as described earlier. Here, the dependence of $p_{13}$ on $y_{11}, y_{10}$, and $y_9$ is only to check whether or not $(y_{11}, y_{10}, y_9) = (1, 1, 1)$. Hence, $y_{11}, y_{10}$, and $y_9$ can be replaced by a single bit—the fourth ancillary bit 650 ($y_{11\ldots 9}$). Accordingly, $p_{13}$ can be determined as a function of five variables $(z_{13}, z_{12}, y_{12}, y_{11\ldots 9}, x_9)$. The corresponding LUT 350 is depicted in view 950 of FIG. 9 to determine $p_{13}$ based on such input bit-values. In view 950, the calculation of $c_{14}$ is depicted for denotational purposes. However, $c_{14}$ is not used.

Calculating $p_{14}$ requires computing the addition:

$$\begin{array}{ccccccc} & 0 & 0 & 0 & y_{12} & 0 & 0 & x_9 \\ + & 0 & z_{14} & z_{13} & z_{12} & y_{11} & y_{10} & y_9 \\ \hline = & c_{15} & p_{14} & p_{13} & p_{12} & p_{11} & p_{10} & p_9 \end{array}$$

where $c_{15}$ is not used, and $p_9$, $p_{10}$, $p_{11}$, $p_{12}$, and $p_{13}$ are determined as described earlier.

Here, the addition is a function of eight variables. As noted earlier, the technical solutions herein overcome the technical challenge of handling such cases with more than six input bit-values. In this particular case, $y_{11}, y_{10}$, and $y_9$ can be replaced by a single bit—the fourth ancillary bit 650 ($y_{11\ldots 9}$)—so that $p_{14}$ can be determined using the LUT 350 shown in view 1010 of FIG. 10.

Calculating $p_{15}$ requires computing the addition:

$$\begin{array}{ccccccccc} & 0 & 0 & 0 & 0 & y_{12} & 0 & 0 & x_9 \\ + & 0 & z_{15} & z_{14} & z_{13} & z_{12} & y_{11} & y_{10} & y_9 \\ \hline = & c_{16} & p_{15} & p_{14} & p_{13} & p_{12} & p_{11} & p_{10} & p_9 \end{array}$$

where $c_{16}$ is not used, and $p_9, p_{10}, p_{11}, p_{12}, p_{13}$, and $p_{14}$ are determined as described earlier.

Here, the addition is a function of nine variables. Again, $y_{11}, y_{10}$, and $y_9$ can be replaced by a single bit—the fourth ancillary bit 650 ($y_{11\ldots 9}$). Furthermore, the dependence of $p_{15}$ on $z_{14}$ and $z_{13}$ is only to check whether or not $(z_{14}, z_{13})$ by the fifth ancillary bit-value 670 ($z_{14\ldots 13}$) can be determined using the LUT 350 shown in view 1110 of FIG. 11 as a function of six variables.

Calculating $p_{16}$ requires computing the addition:

$$\begin{array}{ccccccccc} & 0 & 0 & 0 & 0 & r_{13} & r_{12} & 0 & 0 & 0 \\ + & 0 & q_{10} & q_9 & q_8 & q_7 & q_6 & 0 & 0 & x_9 \\ & 0 & 0 & 0 & 0 & 0 & y_{12} & y_{11} & y_{10} & y_9 \\ \hline = & c_{17} & p_{16} & p_{15} & p_{14} & p_{13} & p_{12} & p_{11} & p_{10} & p_9 \end{array}$$

where $(q_{13}, \ldots, q_6)$ and $(r_{13}, r_{12})$ are computed in first circuit 310, and $(y_{12}, y_{11}, y_{10}, y_9)$ and $x_9$ are computed in the second circuit 320.

As mentioned earlier, the third circuit 330 uses several ancillary bit-values and auxiliary bit-values that are determined by the first circuit 310 and the second circuit 320. For example, the ancillary bit-value $(q_{10\ldots 8})$ 550 is computed at the first circuit 310 to represent:

$$q_{10\ldots 8} = q_{10} \wedge q_9 \wedge q_8 = q_{10} \cdot q_9 \cdot q_8.$$

Further, in the second circuit 320, the result of the following addition can be determined using the LUTs 350:

$$\begin{array}{ccccccc} & 0 & 0 & 0 & 0 & r_{13} & r_{12} \\ + & 0 & q_{10} & q_9 & q_8 & q_7 & q_6 \\ \hline = & t_{17} & z_{16} & z_{15} & z_{14} & z_{13} & z_{12} \end{array}$$

The result of the addition can be computed as a Boolean function of at most six inputs that are computed in the first circuit 310 as follows:

$$z_{12} = z_{12}(r_{12}, q_6)$$

$$z_{13} = z_{13}(r_{13}, r_{12}, q_7, q_6)$$

$$z_{14} = z_{14}(r_{13}, r_{12}, q_8, q_7, q_6)$$

$$z_{15} = z_{15}(r_{13}, r_{12}, q_9, q_8, q_7, q_6)$$

$$z_{16} = z_{16}(r_{13}, r_{12}, q_{10}, q_9 \ldots 8, q_7, q_6),$$

and the bit $$z_{15\ldots 13} = z_{15\ldots 13}(r_{13}, r_{12}, q_9, q_8, q_7, q_6) = z_{15} \cdot z_{14} \cdot z_{13}$$

The $z_{15\ldots 13}$ bit-value is the sixth ancillary bit-value 680. The bit $p_{16}$ can be determined in the third circuit 330 as a Boolean function of six inputs that are determined by the LUTs 350 in the first circuit 310 and/or the second circuit 320:

$$p_{16} = p_{16}(z_{16}, z_{15\ldots 13}, z_{12}, y_{12}, y_{11\ldots 9}, x_9)$$

The view 1210 in FIG. 12 depicts the LUT 350 for determining $p_{16}$ using the above six bit-value input.

Determining the final three MSBs using LUTs 350 is based on the following description of correctness. If N, d, and w, are integers, then:

(i) $w \times d \geq N$ if and only if $d \geq \lceil N/w \rceil$.

(ii) $w \times d < N$ if and only if $$d \leq \left\lfloor \frac{N-1}{w} \right\rfloor.$$

The part (i) above holds true because if $$w \times d \geq N, d \geq \frac{N}{w}, \therefore d \geq \left\lceil \frac{N}{w} \right\rceil.$$

Conversely, if $$d \geq \left\lceil \frac{N}{w} \right\rceil, w \times d \geq w \times \left\lceil \frac{N}{w} \right\rceil \geq w \times \frac{N}{w} = N.$$

In the case (ii) above, if $w \times d < N$, $w \times d \leq N-1$, $$\therefore d \leq \frac{N-1}{w},$$

and $$d \leq \left\lfloor \frac{N-1}{w} \right\rfloor.$$

Conversely, if $$d \leq \left\lfloor \frac{N-1}{w} \right\rfloor, w \times d \leq w \times \left\lfloor \frac{N-1}{w} \right\rfloor \leq w \times \frac{N-1}{w} = N-1.$$

Now, a description is provided for determining the MSB $p_{19}$ using two LUTs 350. Consider $t = \lceil 2^{19}/w \rceil$. $P_{19}(d) = 1 \Leftrightarrow d \geq t$. This holds true because $P_{19}(d) = 1$ if and only if $w \times d \geq 2^{19}$. It should be noted that here, 19 is used because the result of a 12-bit d and an 8-bit w cannot exceed $2^{19}$. However, in the cases where w or d have a different number of bits, the exponent in the above condition is different. Based on the description herein, a person skilled in the art can determine that for every $d \varepsilon B^{12}$, the function $P_{19}(d)$ can be evaluated using two layers of LUTs 350.

Accordingly, referring back to the flowchart in FIG. 4, the third circuit 330 determines whether $d \geq t$, which can be precomputed as a threshold based on the known w, at block 440. If the condition is satisfied, the $p_{19}$ is set to 1, at block 442, else $p_{19}$ is set to 0, at block 444.

Figure 13:
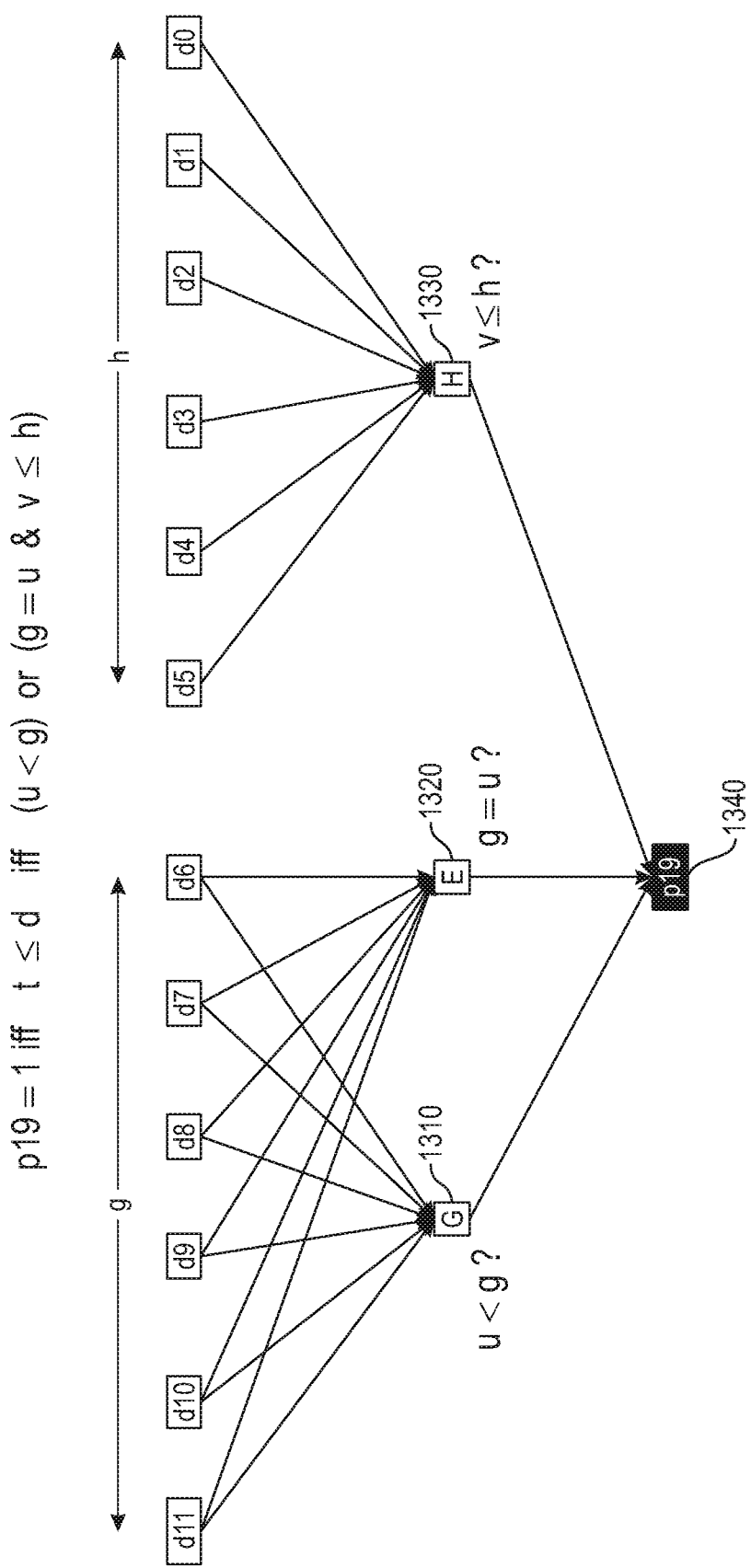
FIG. 13 depicts a circuit used to determine a most significant bit of a multiplication result according to one or more embodiments of the present invention.

FIG. 13 depicts lookup tables for determining $p_{19}$ according to one or more embodiments of the present invention. The LUTs 350 include a first LUT 1310, a second LUT 1320, and a third LUT 1330 that compares d with the precomputed threshold t. For this purpose, t is represented as $t = \lceil 2^{19}/w \rceil = u \cdot 2^6 + v$, where $v < 2^6$. Further, d is represented as $d = g \cdot 2^6 + h$ ($g < 2^6$, and $h < 2^6$). Accordingly, setting $p_{19}$ to 1 if and only if $d \geq t$, implies setting $p_{19}$ to 1 if and only if ((u<g) OR (g=u AND v≤h)).

Using only 6-to-1 Boolean functions, the first LUT 1310 determines if u<g, the second LUT 1320 determines if g=u and the third LUT 1330 determines if v≤h. The output of the LUTs is a 1, if the respective conditions hold true, and 0 otherwise. Further, a fourth LUT 1340 receives the outputs from the first LUT 1310, the second LUT 1320, and the third LUT 1330. Depending on the received bit-values, the fourth LUT 1340 determines the value of $p_{19}$.

Now, a description is provided for determining the MSB $p_{18}$ using two LUTs 350. It should be noted that $p_{18} = 1$, if and only if one of the following conditions holds:

$$2^{18} \leq w \times d < 2^{19} \quad \text{(i)}$$

$$2^{19} + 2^{18} \leq w \times d \quad \text{(ii)}$$

The following three thresholds can be precomputed based on the known w:

$$t_{01} = \left\lceil \frac{2^{18}}{w} \right\rceil$$

$$t_{10} = \left\lceil \frac{2^{19}-1}{w} \right\rceil$$

$$t_{11} = \left\lceil \frac{2^{19}+2^{18}}{w} \right\rceil$$

Accordingly, the method 400 includes setting $p_{18}$ to 1, at block 452, and else to 0, at block 454, based on the third circuit 330 determining, at block 450, whether the following condition holds:

$$t_{01} \leq d \leq t_{10} \quad \text{(i)}$$

$$t_{11} \leq d. \quad \text{(ii)}$$

The above is further equivalent to setting $p_{18}$ to 1 if and only if one of the following conditions holds:

$$(t_{01} < d < t_{10}) \text{ or } (t_{11} < d) \quad \text{(i)}$$

$$d \in \{t_{01}, t_{10}, t_{11}\}. \quad \text{(ii)}$$

Again, consider d represented as $d = g \cdot 2^6 + h$. Let us denote $B^2 = \{01, 10, 11\}$, and then, for every $\beta \in B^2$, $t_\beta = u_\beta \cdot 2^6 + v_\beta$, where $0 \leq v_\beta \leq 2^6$. Accordingly, determining the value for $p_{18}$ can be stated as $p_{18} = 1$ if and only if one of the following conditions holds:

1. $g > v_{01}$ or ($g = u_{01}$ and $h \geq v_{01}$) (i.e., $d \geq t_{01}$)

and

2. $q < u_{10}$ or ($g = u_{10}$ and $h \leq v_{10}$) (i.e., $d \leq t_{10}$) (i)

$g > u_{11}$ or ($g = u_{11}$ and $h \geq v_{11}$) (i.e., $d \geq t_{11}$) (ii)

This can be simplified as $p_{18} = 1$ if and only if one of the following eight conditions holds:

| | |
|---|---|
| ($u_{01} < h < u_{10}$) or $u_{11} < g$) | 00: |
| $g = u_{01}$ and $h \geq v_{01}$ | 01: |
| $g = u_{10}$ and $h \leq v_{10}$ | 10: |
| $g = u_{11}$ and $h \geq v_{11}$ | 11: |

Consider the notation, that with any inequality of variables x<y, z≤w, etc., a truth value $\emptyset(x<y) \in \{0,1\}$, where 1 is "true," and 0 is "false," and logical connectives can be applied in the form, for example, $\emptyset(x=y) = \emptyset(x \leq y) \wedge \emptyset(x \geq y)$.

Accordingly, the above eight conditions can be succinctly stated as:

$$P_{18}(d) = [\phi(t_{01} \leq d) \wedge \phi(d \leq t_{10})] \vee \phi(t_{11} \leq d).$$

The values for $t_{01}$, $t_{10}$, and $t_{11}$ can be represented as:

$$t_{01} = u_{01} \cdot 2^6 + v_{01} \text{ where } 0 \leq v_{01} < 2^6,$$

$$t_{10} = u_{10} \cdot 2^6 + v_{10} \text{ where } 0 \leq v_{10} < 2^6,$$

$$t_{11} = u_{11} \cdot 2^6 + v_{11} \text{ where } 0 \leq v_{11} < 2^6.$$

Now, for every $\beta \in \{01, 10, 11\}$, $u_\beta = t_\beta / 2^6$; hence, $u_{01} \leq u_{10} \leq u_{11}$. Each possible number g is related to $u_{01}$, $u_{10}$, and $u_{11}$ in one of seven possible ways, which can be labeled with three bits as follows:

$$g < u_{01} \tag{001}$$

$$g = u_{01} \tag{010}$$

$$u_{01} < g < u_{10} \tag{011}$$

$$g = u_{10} \tag{100}$$

$$u_{10} < g < u_{11} \tag{101}$$

$$g = u_{11} \tag{110}$$

$$u_{11} < g \tag{111}$$

It follows that given g, the particular case label $(x_1, x_2, x_3)$ can be returned by three 6-to-1 Boolean functions, $x_1(g)$, $x_2(g)$, $x_3(g)$. Given $(x_1, x_2, x_3)$, the information required for the evaluation of $P_{18}(d)$ can be expressed as:

$$(u_{01} < g) \equiv x_1 \vee (\neg x_1 \wedge x_2 \wedge x_3)$$

$$(u_{01} = g) \equiv x_1 \wedge \neg x_2 \wedge x_3$$

$$(g < u_{10}) \equiv \neg x_1$$

$$(g = u_{10}) \equiv x_1 \wedge \neg x_2 \wedge \neg x_3$$

$$(u_{11} < g) \equiv x_1 \wedge x_2 \wedge x_3$$

$$(u_{11} = g) \equiv x_1 \wedge x_2 \wedge \neg x_3$$

The situation with respect to the relation of h to the $v_\beta$ is simpler. The only information required for the evaluation of $P_{18}(d)$ is captured by the following 6-to-1 Boolean functions:

$$y_1(h) = \begin{cases} 1 & \text{if } h \geq v_{01} \\ 0 & \text{otherwise} \end{cases}$$

$$y_2(h) = \begin{cases} 1 & \text{if } h \leq v_{10} \\ 0 & \text{otherwise} \end{cases}$$

$$y_3(h) = \begin{cases} 1 & \text{if } h \geq v_{11} \\ 0 & \text{otherwise} \end{cases}.$$

At this stage, it can be shown that for every $d \in B_{12}$ the function $P_{18}(d)$ can be evaluated in two layers. The evaluation of $P_{18}(d)$ relies on the inequality relations of d to the $t_\beta$s. Accordingly:

$$d \geq t_{01} \Leftrightarrow (g > u_{01}) \vee [(g = u_{01}) \wedge (h \geq v_{01})]$$

$$d \leq t_{10} \Leftrightarrow (g < u_{10}) \vee [(g = u_{10}) \wedge (h \leq v_{10})]$$

$$d \geq t_{11} \Leftrightarrow (g > u_{11}) \vee [(g = u_{11}) \wedge (h \geq v_{11})]$$

Further:

$$\phi(d \geq t_{01}) = \phi(g > u_{01}) \vee (\phi(g \leq u_{01}) \wedge y_1(h))$$

$$\phi(d \leq t_{10}) = \phi(g < u_{01}) \vee (\phi(g \leq u_{10}) \wedge y_2(h))$$

$$\phi(d \geq t_{11}) = \phi(g > u_{11}) \vee (\phi(g \leq u_{11}) \wedge h_3(y))$$

Thus, it follows that the relations of d to the $t_\beta$s can be evaluated by the following 6-to-1 Boolean function, applied to the 6-tuple $(x_1(g), x_2(g), x_3(g), y_1(h), y_2(h), y_3(h))$.

Figure 14:
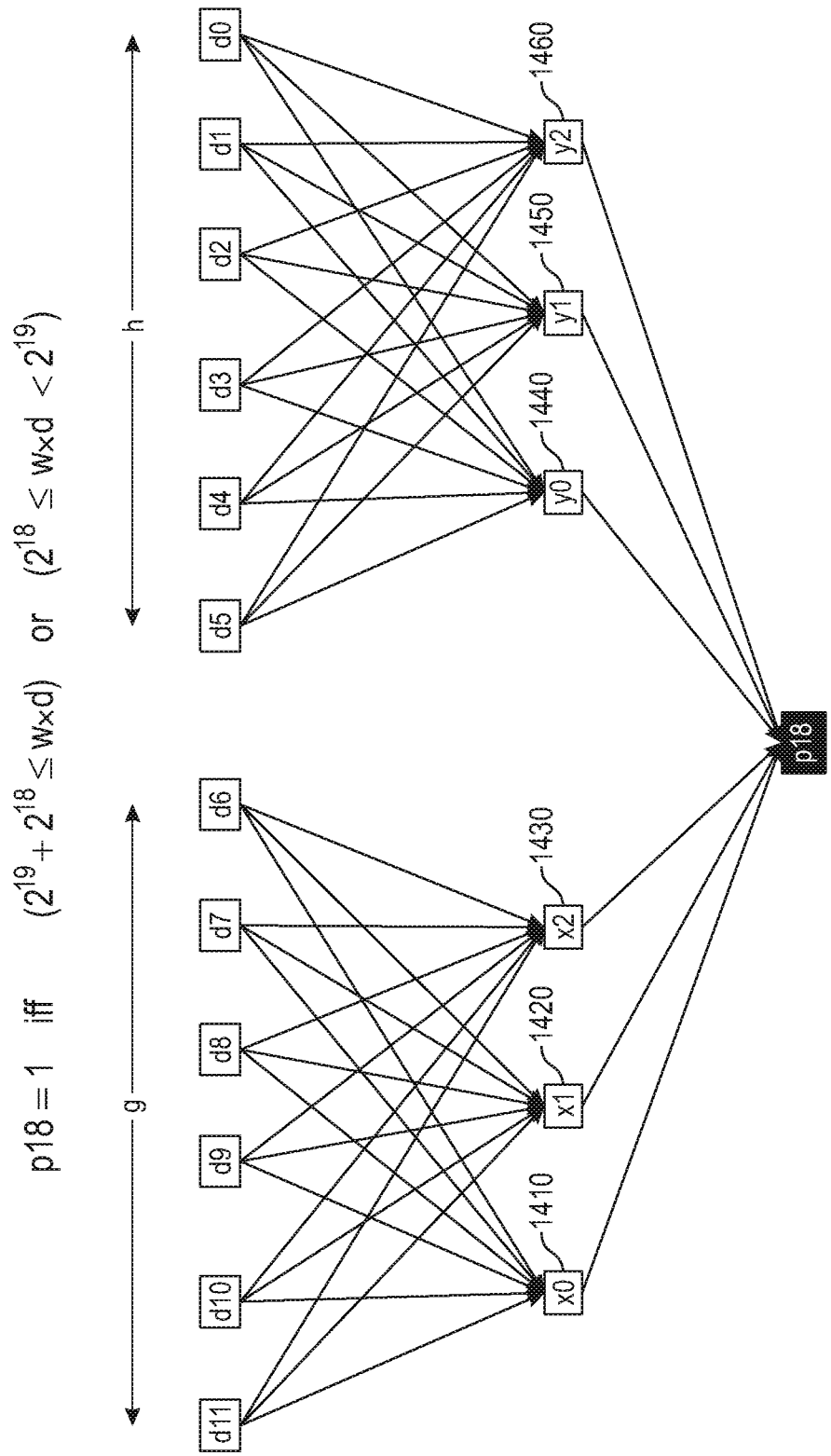
FIG. 14 depicts a circuit used to determine a second most significant bit of a multiplication result according to one or more embodiments of the present invention.

FIG. 14 depicts lookup tables for determining $p_{18}$ according to one or more embodiments of the present invention. The LUTs 350 for determining $p_{18}$ are in a two-layer setup. The LUTs 350 include a first LUT 1410, a second LUT 1420, and a third LUT 1430 that determine $x_1(g)$, $x_2(g)$, $x_3(g)$, respectively. Further, the LUTs 350 include a fourth LUT 1440, a fifth LUT 1450, and a sixth LUT 1460 that determine $y_1(h)$, $y_2(h)$, $y_3(h)$, respectively. The bit-values of the $x_1(g)$, $x_2(g)$, $x_3(g)$, $y_1(h)$, $y_2(h)$, $y_3(h)$, are used to determine $p_{18}$.

It can be shown that if $1 \leq w \leq 256$, then $u_{01} < u_{10}$. That is because even if w=256, $$u_{01} = \left\lfloor \frac{\lfloor 2^{18}/256 \rfloor}{2^6} \right\rfloor = \left\lfloor \frac{2^{10}}{2^6} \right\rfloor = 2^4; \text{ and}$$

$$u_{10} = \left\lfloor \frac{\lceil (2^{19}-1)/256 \rceil}{2^6} \right\rfloor = \left\lfloor \frac{2^{11}-1}{2^6} \right\rfloor = 2^5 - 1$$

Now, a description is provided for determining the third MSB $p_{17}$ using three layers of LUTs. $p_{17}=1$ if and only if one of the following conditions holds:

$$2^{17} \leq w \times d < 2^{18} \tag{i}$$

$$2^{18} + 2^{17} \leq w \times d < 2^{19} \tag{ii}$$

$$2^{19} + 2^{17} \leq w \times d < 2^{19} + 2^{17} \tag{iii}$$

$$2^{19} + 2^{18} + 2^{17} \leq w \times d \tag{iv}$$

The conditions can be restated using seven thresholds:

$$t_{001} = \left\lceil \frac{2^{17}}{w} \right\rceil$$

$$t_{010} = \left\lfloor \frac{2^{18}-1}{w} \right\rfloor$$

$$t_{011} = \left\lceil \frac{2^{18}+2^{17}}{w} \right\rceil$$

$$t_{100} = \left\lfloor \frac{2^{19}+1}{w} \right\rfloor$$

$$t_{101} = \left\lceil \frac{2^{19}+2^{17}}{w} \right\rceil$$

$$t_{110} = \left\lfloor \frac{2^{19}+2^{18}-1}{w} \right\rfloor$$

$$t_{111} = \left\lceil \frac{2^{19}+2^{18}+2^{17}}{w} \right\rceil$$

The conditions can be restated using these seven thresholds as:

$$t_{001} \leq d \leq t_{010} \tag{i}$$

$$t_{011} \leq d \leq t_{100} \tag{ii}$$

$$t_{101} \leq d \leq t_{110} \tag{iii}$$

$$t_{111} \leq d. \tag{iv}$$

Referring to the flowchart in FIG. 4, method 400 includes setting $p_{17}=1$, at block 462, if the above conditions using the thresholds are met, at block 460; otherwise, $p_{17}=0$, at block

464. The conditions can be further restated as $p_{17}=1$ if and only if one of the following conditions holds:

$(t_{001}<d<t_{010})$ or $(t_{011}<d<t_{100})$ or $(t_{101}<d<t_{110})$ or $(t_{111}<d)$     (i)

$d \in \{t_{001}, t_{010}, t_{011}, t_{100}, t_{101}, t_{110}, t_{111}\}$.     (ii)

Again, consider d represented as $d=g \cdot 2^6 + h$. Let us denote $B^3 = \{001, 010, 011, 100, 101, 110, 111\}$, and then, for every $\beta \in B^3$, $t_\beta = u_\beta \cdot 2^6 + v_\beta$, where $0 \leq v_\beta \leq 2^6$. Accordingly, determining the value for $p_{18}$ can be stated as $p_{17}=1$ if and only if one of the following conditions holds:

1. $g>u_{001}$ or ($g=u_{001}$ and $h \geq v_{001}$) (i.e., $d \geq t_{001}$)

and

2. $g<u_{010}$ or ($g=u_{010}$ and $h \leq v_{010}$) (i.e., $d \leq t_{010}$)     (i)

1. $g>u_{011}$ or ($g=u_{011}$ and $h \geq v_{011}$) (i.e., $d \geq t_{011}$)

and

2. $g<u_{100}$ or ($g=u_{100}$ and $h \leq v_{100}$) (i.e., $d \leq t_{100}$)     (ii)

1. $g>u_{101}$ or ($g=u_{101}$ and $h \geq v_{101}$) (i.e., $d \geq t_{101}$)

and

2. $g<u_{110}$ or ($g=u_{110}$ and $h \leq v_{110}$) (i.e., $d \leq t_{110}$)     (iii)

$g<u_{111}$ or ($g=u_{11}$ and $h \geq v_{111}$) (i.e., $d \geq t_{111}$).     (iv)

This can be simplified as $p_i 7=1$ if and only if one of the following eight conditions holds:

$(u_{001}<g<u_{010})$ or $(u_{011}<g<u_{100})$ or $(u_{101}<g<u_{110})$ or $(u_{111}<g)$     000:

$g=u_{001}$ and $h \geq v_{001}$     001:

$g=u_{010}$ and $h \geq v_{010}$     010:

$g=u_{011}$ and $h \geq v_{011}$     011:

$g=u_{100}$ and $h \geq v_{100}$     100:

$g=u_{101}$ and $h \geq v_{101}$     101:

$g=u_{110}$ and $h \geq v_{110}$     110:

$g=u_{111}$ and $h \geq v_{111}$     111:

Any Boolean function of $(x_1, \ldots, x_4)$ is also a Boolean function of g, so it can be evaluated in the first circuit 310. Accordingly, to compress the representation to three bits based on the following:

If g satisfies one of the following, then $P_{17}(d)=1$:

$u_{001}<g<u_{010}$     (i)

$u_{011}<g<u_{100}$     (ii)

$u_{101}<g<u_{110}$     (iii)

$u_{111}<g$     (iv)

If g satisfies one of the following, then $P_{17}(d)=0$:

$g<u_{001}$     (i)

$u_{010}<g<u_{011}$     (ii)

$u_{100}<g<u_{101}$     (iii)

$u_{110}<g<u_{111}$     (iv)

However, this still needs encoding of seven possible equalities, namely $g=u_\beta$, $\beta \in B^3$, and so, three bits cannot be used to encode nice cases. However, for every $\beta \in B^3$, the case $g=u_\beta$ can be encoded by $0\beta$; for example, $g=u_{011}$ is encoded by 011. Accordingly, the case for $P_{17}(d)=1$ can be encoded by:

$(u_{001}<g<u_{010})$ or $(u_{011}<g<u_{100})$ or $(u_{101}<g<u_{110})$ or $(u_{111}<g)$

Additionally, the case for $P_{17}(d)=0$ can be encoded by:

$(u_{010}<g<u_{011})$ or $(u_{100}<g<u_{101})$ or $(u_{110}<g<u_{111})$

This four-bit encoding is denoted as $(z_1, z_2, z_3, z_4)$. The encoding is depicted by view 1510 in FIG. 15. Thus, the four Boolean functions are:

$z_1 = \phi(u_{001}<g<u_{010}) \vee \phi(u_{011}<g<u_{100}) \vee \phi(u_{101}<g<u_{110}) \vee \phi(u_{111}<g)$ $z_2 = \phi(g \leq u_{100}) \vee \phi(g=u_{101}) \vee \phi(g=u_{110}) \vee \phi(g=u_{111})$ $z_3 \phi(g=u_{010}) \vee \phi(g=u_{011}) \vee \phi(g=u_{110}) \vee \phi(g=u_{111})$ $z_4 = \phi(g=u_{001}) \vee \phi(g \leq u_{011}) \vee \phi(g=u_{101}) \vee \phi(g=u_{111})$ The situation with respect to the relation of h to the $v_\beta$s is simpler but more complicated than the case of $p_{18}$. Here, the following truth-values are required:

$\phi(h \geq v_{001})$, $\phi(h \leq v_{010})$, $\phi(h \geq v_{011})$, $\phi(h \leq v_{100})$, $\phi(h \geq v_{101})$, $\phi(h \leq v_{110})$, $\phi(h \geq v_{111})$.

Let $v_1 < v_2 < \ldots < v_l$ ($l \leq 7$) be the distinct elements of $\{v_\beta: \beta \in B^3\}$ and let $\psi(\beta) \in \{1, \ldots, l\}$ be the index such that $v_{\psi(\beta)} = v_\beta$. Thus, the above seven values can be expressed as:

$\phi(h \geq v_{\psi(001)})$, $\phi(h \leq v_{\psi(010)})$, $\phi(h \geq v_{\psi(011)})$, $\phi(h \leq v_{\psi(100)})$, $\phi(h \geq v_{\psi(101)})$, $\phi(h \leq v_{\psi(11)})$, $\phi(h \geq v_{\psi(111)})$.

The relations of h to all of these seven values can be captured by three bits $(y_1, y_2, y_3)$ as follows. First note, that each occurrence of $v_\beta$ is involved in precisely one inequality, namely, depending on $\beta$ either $\emptyset(h \geq v_\beta)$ has to be known or $\emptyset(h \leq v_\beta)$ has to be known. The former occurs when $\beta \in \{001, 011, 101, 111\}$, and the latter when $\beta \in \{010, 100, 110\}$. Therefore, there are precisely seven cases that are needed to characterize the location of h with respect to $v_1 < v_2 < \ldots < v_l$ so that the information required is retrieved. The cases can be viewed as a partition of the set $\{0, 1, \ldots 63\}$ into at most eight intervals, some of which may consist of a single point. These seven cases are defined by inserting the seven inequality signs that occur in the above seven conditions in the appropriate places. The inequality signs also take into account $v_1, \ldots, v_l$ as follows. Let $1 \leq i \leq l$, and consider a certain value $v_i$. If $i=\psi(\beta)$, then (i) if $\beta \in \{001, 011, 101, 111\}$, then include an inequality $\leq v_i$, and (ii) if $\beta \in \{010, 100, 110\}$, then include an inequality $v_i \leq$. If there exists $\beta_1 \in \{001, 011, 101, 111\}$, and $\beta_2 \in \{010, 100, 110\}$, such that $i=\psi(\beta_1)=\psi(\beta_2)$, then two inequalities are included: $\leq v_i$, and $v_i \leq$. If it has to be known whether or not $h \leq v_\beta$, then in the partition $v_\beta$ must be the right endpoint of one of the intervals, and if it has to be known whether or not $h \geq v_\beta$, then in the partition $v_\beta$ must be the left endpoint of one of the intervals. This way, if it is known which of the intervals contains h, then the information that is required about its relation to any $v_\beta$ is known. For example, suppose:

$$v_{001}=3 \quad v_{010}=4$$

$$v_{011}=7 \quad v_{100}=8$$

$$v_{101}=11 \quad v_{110}=12$$

$$v_{111}=15$$

Here, it is to be determined whether or not h≥3, whether or not h≤4, whether or not h≥7, whether or not h≤8, whether or not h≥11, whether or not h≤12, and whether or not h≥15. Therefore, the partition into eight intervals is the following:

| | |
|---|---|
| 0≤h≤2 | 000: |
| 3≤h≤4 | 001: |
| 5≤h≤6 | 010: |
| 7≤h≤8 | 011: |
| 9≤h≤10 | 100: |
| 11≤h≤12 | 101: |
| 13≤h≤14 | 110: |
| 15≤h≤63 | 111: |

The labels on the left provide the encoding with three bits, so the corresponding three Boolean functions are represented in view 1520 in FIG. 15. The Boolean functions $b_1$, $b_2$, and $b_3$ are the following:

$$b_1(h)=\phi(9\leq h\leq 63)$$

$$b_2(h)=\phi(5\leq h\leq 8)\vee\phi(13\leq h\leq 63)$$

$$b_3(h)=\phi(3\leq h\leq 4)\vee\phi(7\leq h\leq 8)\vee\phi(11\leq h\leq 12)\vee\phi(15\leq h\leq 63)$$

Thus, it follows that the relations of d to the $t_\beta$s can be evaluated by a single 7-to-1 Boolean function $f(z_1, \ldots, z_4, b_1, b_2, b_3)$. This evaluation can be carried out as follows. First, a Boolean function $f(z_2, z_3, z_4, b_1, b_2, b_3)$ is defined and implemented in the second circuit 320 by setting its value to 1 when $(z_2, z_3, z_4)\neq(0, 0, 0)$, and every x in the interval indicated by $(b_1, b_2, b_3)$ satisfies the bound on h that is required given that g has the value indicated by $(z_2, z_3, z_4)$; otherwise, $f(z_2, z_3, z_4, b_1, b_2, b_3)=0$. In the third circuit 330, the value of $P_{17}$ is set to 1 if $z_1=1$ or $f(z_2, z_3, z_4, b_1, b_2, b_3)=1$; otherwise, $P_{17}$ is set to 0.

Figure 16:
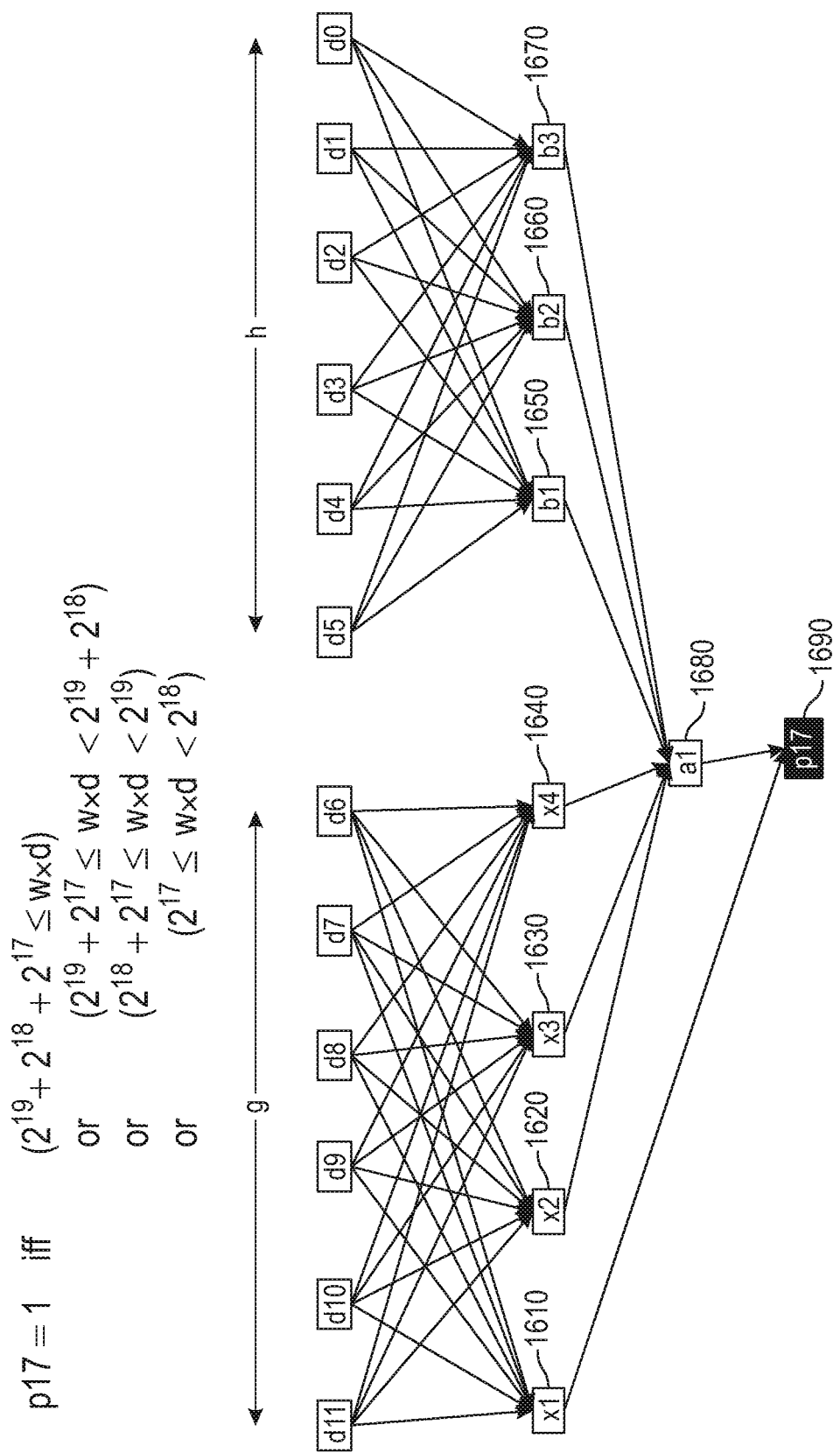
FIG. 16 depicts a circuit used to determine a third most significant bit of a multiplication result according to one or more embodiments of the present invention.

FIG. 16 depicts a three-layer LUT circuit for determining $p_{17}$ according to one or more embodiments of the present invention. The LUTs 350 include a set of four LUTs—a first LUT 1610, a second LUT 1620, a third LUT 1630, and a fourth LUT 1640—for determining results of $z_1$, $z_2$, $z_3$, and $z_4$, respectively by comparing portions of g and u as described above. Further, the LUTs 350 include another set of three LUTs—a fifth LUT 1650, a sixth LUT 1660, and a seventh LUT 1670—for determining $b_1$, $b_2$, $b_3$, respectively by encoding h as described above. An eighth LUT 1680 uses the $z_2$, $z_3$, $z_4$, and $b_1$, $b_2$, $b_3$ to determine an output $a_1$. A ninth LUT 1690 uses $z_1$ and $a_1$ to determine $p_{17}$.

Accordingly, embodiments of the present invention provide a circuit of 6-input Boolean gates for multiplying a given (known) Boolean vector $w=(w_7, w_6, w_5, w_4, w_3, w_2, w_1, w_0)$ by any Boolean input vector $d=(d_{11}, d_{10}, d_9, d_8, d_7, d_6, d_5, d_4, d_3, d_2, d_1, d_0)$. w has a predetermined length, for example, eight bits. d has a predetermined length, for example, twelve bits. By implementing the circuit using LUTs, for example, in an FPGA, an ASIC, or any other electronic circuit or device, embodiments of the present invention improve the efficiency of determining the product result in lesser time than performing the computation. The circuit can be used in a variety of computing environments, such as a neural network system, a computing device, a quantum computer, a mainframe computer, a memory controller, or any other type of apparatus that requires computing multiplications, and particularly where one of the numbers in the multiplication is a known value.

Further, embodiments of the present invention use FPGAs that limit each of the LUTs to use at most six inputs. Accordingly, embodiments of the present invention facilitate a practical application of determining a multiplication result and improving the efficiency of such computations performed by present solutions. Embodiments of the present invention, accordingly, provide an improvement to a particular technology, in this case, computing technology. Further yet, embodiments of the present invention facilitate improvements to present solutions such as neural networks and other types of computing systems by improving their efficiency at computing such multiplications, the results of which are used in various applications.

Figure 17:
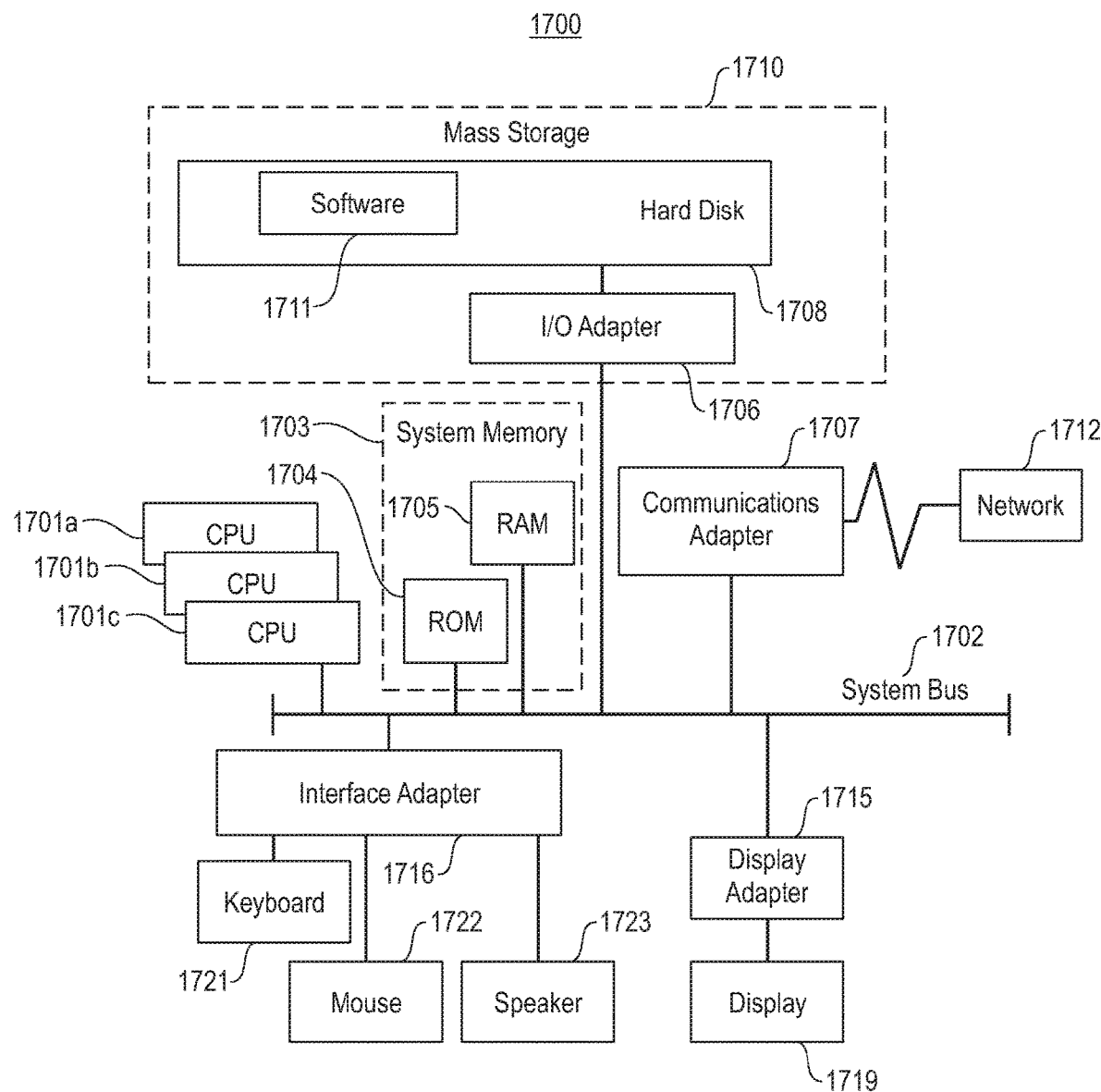
FIG. 17 depicts a computing system that can be used to implement one or more embodiments of the present invention.

The neural network system 200 can be implemented using a computer system or any other apparatus. Turning now to FIG. 17, a computer system 1700 is generally shown in accordance with an embodiment. The computer system 1700 can be an electronic, computer framework comprising and/or employing any number and combination of computing devices and networks utilizing various communication technologies, as described herein. The computer system 1700 can be easily scalable, extensible, and modular, with the ability to change to different services or reconfigure some features independently of others. The computer system 1700 may be, for example, a server, desktop computer, laptop computer, tablet computer, or smartphone. In some examples, the computer system 1700 may be a cloud computing node. Computer system 1700 may be described in the general context of computer system executable instructions, such as program modules, being executed by a computer system. Generally, program modules may include routines, programs, objects, components, logic, data structures, and so on that perform particular tasks or implement particular abstract data types. Computer system 1700 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 17, the computer system 1700 has one or more central processing units (CPU(s)) 1701a, 1701b, 1701c, etc. (collectively or generically referred to as processor(s) 1701). The processors 1701 can be a single-core processor, multi-core processor, computing cluster, or any number of other configurations. The processors 1701, also referred to as processing circuits, are coupled via a system bus 1702 to a system memory 1703 and various other components. The system memory 1703 can include a read-only memory (ROM) 1704 and a random access memory (RAM) 1705. The ROM 1704 is coupled to the system bus 1702 and may include a basic input/output system (BIOS), which controls certain basic functions of the computer system 1700. The RAM is read-write memory coupled to the system bus 1702 for use by the processors 1701. The system memory 1703 provides temporary memory space for operations of said instructions during operation. The system memory 1703 can include random access memory (RAM), read-only memory, flash memory, or any other suitable memory systems.

The computer system 1700 comprises an input/output (I/O) adapter 1706 and a communications adapter 1707 coupled to the system bus 1702. The I/O adapter 1706 may be a small computer system interface (SCSI) adapter that communicates with a hard disk 1708 and/or any other similar component. The I/O adapter 1706 and the hard disk 1708 are collectively referred to herein as a mass storage 1710.

Software 1711 for execution on the computer system 1700 may be stored in the mass storage 1710. The mass storage 1710 is an example of a tangible storage medium readable by the processors 1701, where the software 1711 is stored as instructions for execution by the processors 1701 to cause the computer system 1700 to operate, such as is described hereinbelow with respect to the various Figures. Examples of computer program product and the execution of such instruction is discussed herein in more detail. The communications adapter 1707 interconnects the system bus 1702 with a network 1712, which may be an outside network, enabling the computer system 1700 to communicate with other such systems. In one embodiment, a portion of the system memory 1703 and the mass storage 1710 collectively store an operating system, which may be any appropriate operating system, such as the z/OS or AIX operating system from IBM Corporation, to coordinate the functions of the various components shown in FIG. 17.

Additional input/output devices are shown as connected to the system bus 1702 via a display adapter 1715 and an interface adapter 1716 and. In one embodiment, the adapters 1706, 1707, 1715, and 1716 may be connected to one or more I/O buses that are connected to the system bus 1702 via an intermediate bus bridge (not shown). A display 1719 (e.g., a screen or a display monitor) is connected to the system bus 1702 by a display adapter 1715, which may include a graphics controller to improve the performance of graphics intensive applications and a video controller. A keyboard 1721, a mouse 1722, a speaker 1723, etc. can be interconnected to the system bus 1702 via the interface adapter 1716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 17, the computer system 1700 includes processing capability in the form of the processors 1701, and, storage capability including the system memory 1703 and the mass storage 1710, input means such as the keyboard 1721 and the mouse 1722, and output capability including the speaker 1723 and the display 1719.

In some embodiments, the communications adapter 1707 can transmit data using any suitable interface or protocol, such as the internet small computer system interface, among others. The network 1712 may be a cellular network, a radio network, a wide area network (WAN), a local area network (LAN), or the Internet, among others. An external computing device may connect to the computer system 1700 through the network 1712. In some examples, an external computing device may be an external web server or a cloud computing node.

It is to be understood that the block diagram of FIG. 17 is not intended to indicate that the computer system 1700 is to include all of the components shown in FIG. 17. Rather, the computer system 1700 can include any appropriate fewer or additional components not illustrated in FIG. 17 (e.g., additional memory components, embedded controllers, modules, additional network interfaces, etc.). Further, the embodiments described herein with respect to computer system 1700 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5% or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for multiplying two binary numbers, the method comprising:
configuring, in an integrated circuit, a plurality of lookup tables based on a known binary number (w), the lookup tables being configured in three layers;
receiving, by the integrated circuit, an input binary number (d); and
determining, by the integrated circuit, a binary multiplication result (p) of the known binary number w and the input binary number d by determining each bit ($p_i$) from p using the lookup tables, based on a specific combination of bits from the known binary number w and from the input binary number d, wherein the notation $j_x$ is binary notation to represent the $x^{th}$ rightmost bit of a binary number j, bit $j_0$ being the rightmost bit of j.

2. The method of claim 1, wherein the known binary number w is an 8-bit binary number.

3. The method of claim 1, wherein the input binary number d has a predetermined number of bits.

4. The method of claim 3, wherein the input binary number d is a 12-bit binary number.

5. The method of claim 4, wherein the input binary number d is received from a 12-bit image sensor.

6. The method of claim 1, wherein bits $p_5$, $p_4$, $p_3$, $p_2$, $p_1$, and $p_0$ of the multiplication result p are determined by a first circuit from the integrated circuit based on bits $d_5$, $d_4$, $d_3$, $d_2$, $d_1$, and $d_0$ of the input binary number d, the first circuit comprising a first one of the layers of the lookup tables.

7. The method of claim 6, wherein bits $p_8$, $p_7$, and $p_6$ of the multiplication result p are determined by a second circuit from the integrated circuit based on a first set of auxiliary bits computed by the first circuit, the second circuit comprising a second one of the layers of the lookup tables.

8. The method of claim 7, wherein bits $p_{16}$, $p_{15}$, $p_{14}$, $p_{13}$, $p_{12}$, $p_{11}$, and $p_{10}$ of the multiplication result p are determined by a third circuit from the integrated circuit based on auxiliary bits computed by the second circuit, the third circuit comprising a third one of the layers of the lookup tables.

9. The method of claim 8, wherein determining bit $p_{19}$ of the multiplication result p comprises:
determining, by using a subset of the lookup tables, that t≤d, wherein t=$\lceil 2^{19}/w \rceil$ is a precomputed threshold, and d is the input binary number; and
in response to t≤d, setting $p_{19}$ to 1, and otherwise setting $p_{19}$ to 0.

10. The method of claim 8, wherein determining bit $p_{18}$ of the multiplication result p comprises:
precomputing threshold values $t_{01}$, $t_{10}$, and $t_{11}$ using the known binary number w:

$t_{01}=\lceil 2^{18}/w \rceil$, $t_{10}=\lfloor (2^{19}-1)/w \rfloor$, and $t_{11}=\lceil (2^{19}+2^{18})/w \rceil$; and in response to ($t_{11} \leq d$) or ($t_{01} \leq d \leq t_{10}$), setting the bit $p_{18}$ to 1, and otherwise setting the bit $p_{18}$ to 0, d being the input binary number.

11. The method of claim 8, wherein determining bit $p_{17}$ of the multiplication result p comprises:
precomputing a plurality of threshold values using the known binary number w:

$t_{001}=\lceil 2^{17}/w \rceil$, $t_{010}=\lfloor (2^{18}-1)/w \rfloor$, $t_{011}=\lceil (2^{18}+2^{17})/w \rceil$, $t_{100}=\lfloor (2^{19}-1)/w \rfloor$, $t_{101}=\lceil (2^{19}+2^{17})/w \rceil$, $t_{110}=\lfloor (2^{19}+2^{18}-1)/w \rfloor$, and $t_{111}=\lceil (2^{19}+2^{18}+2^{17})/w \rceil$; and setting the bit $p_{17}$ to 1 in response to a subset of the plurality of threshold values:

$t_{111} \leq d$, $t_{101} \leq d \leq t_{110}$, $t_{011} \leq d \leq t_{100}$, and $t_{001} \leq d \leq t_{010}$; and setting $p_{17}$ to 0 otherwise, wherein d is the input binary number.

12. A system comprising:
a memory device that stores a known binary number (w); and
a multiplication circuit that is configured to perform a method to determine a multiplication result (p) of the known binary number w with an input binary number (d) that is received dynamically, the method comprising:
configuring a plurality of lookup tables in the multiplication circuit based on the known binary number w, wherein the lookup tables are setup in three layers; and
determining the multiplication result p of the known binary number w and the input binary number d using the lookup tables, wherein each bit ($p_i$) from the multiplication result p is determined from the lookup tables based on specific combinations of bits from the known binary number w and from the input binary number d, wherein $j_x$ is a binary notation that represents the $x^{th}$ rightmost bit of j, with bit $j_0$ being the rightmost bit of j.

13. The system of claim 12, wherein bits $p_5$, $p_4$, $p_3$, $p_2$, $p_1$, and $p_0$ of the multiplication result p are determined by a first layer of the lookup tables from the multiplication circuit based on bits $d_5$, $d_4$, $d_3$, $d_2$, $d_1$, and $d_0$ of input binary number d.

14. The system of claim 13, wherein the bits $p_8$, $p_7$, and $p_6$, of the multiplication result p, are determined by a second layer of the lookup tables from the multiplication circuit based on a first set of auxiliary bits computed by the first layer.

15. The system of claim 14, wherein bits $p_{16}$, $p_{15}$, $p_{14}$, $p_{13}$, $p_{12}$, $p_{11}$, and $p_{10}$ of the multiplication result p are determined by a third layer of the lookup tables from the multiplication circuit based on auxiliary bits computed by the second layer.

16. The system of claim 13, wherein determining bit $p_{19}$ of the multiplication result p comprises:
  determining, using a subset of lookup tables, that $t \leq d$, wherein $t = \lceil 2^{19}/w \rceil$ is a precomputed threshold; and
  in response to $t \leq d$, setting $p_{19}$ to 1, and otherwise setting the bit $p_{19}$ to 0, d being the input binary number.

17. The system of claim 13, wherein determining bit $p_{18}$ of the multiplication result p comprises:
  precomputing a plurality of threshold values $t_{01}$, $t_{10}$, and $t_{11}$ based on the known binary number w:

$t_{01} = \lceil 2^{18}/w \rceil$, $t_{10} = \lfloor (2^{19}-1)/w \rfloor$, and $t_{11} = \lceil (2^{19}+2^{18})/w \rceil$; and in response to $(t_{11} \leq d)$ or $(t_{01} \leq d \leq t_{10})$, setting the bit $p_{18}$ to 1, and otherwise setting the bit $p_{18}$ to 0, wherein d is the input binary number.

18. The system of claim 17, wherein determining bit $p_{17}$ of the multiplication result p comprises:
  precomputing a plurality of threshold values using the known binary number:

$t_{001} = \lceil 2^{17}/w \rceil$, $t_{010} = \lfloor (2^{18}-1)/w \rfloor$, $t_{011} = \lceil (2^{18}+2^{17})/w \rceil$, $t_{100} = \lfloor (2^{19}-1)/w \rfloor$, $t_{101} = \lceil (2^{19}+2^{17})/w \rceil$, $t_{110} = \lfloor (2^{19}+2^{18}-1)/w \rfloor$, and $t_{111} = \lceil (2^{19}+2^{18}+2^{17})/w \rceil$; and setting the bit $p_{17}$ to 1 in response to a subset of the plurality of threshold values:

$t_{111} \leq d$, $t_{101} \leq d \leq t_{110}$, $t_{011} \leq d \leq t_{100}$, and $t_{001} \leq d \leq t_{010}$; and setting the bit $p_{17}$ to 0 otherwise, wherein d is the input binary number.

19. A neural network system comprising:
  a multiplication circuit configured to determine a multiplication result (p) of multiplying a weight value (w) that has a known value with an input value (d) that is received dynamically, wherein, p, d, and w are binary numbers, determining the multiplication result p comprises:
  configuring a plurality of lookup tables in an integrated circuit based on the weight value w that is a known value, the lookup tables are arranged in three layers; and
  outputting the multiplication result p using the lookup tables, wherein each bit of the multiplication result p is independently determined from the lookup tables based on specific combination of bits from the weight value w and from the input value d, wherein a notation $j_x$ represents the $x^{th}$ bit of j from the right, with bit $j_0$ being the rightmost bit of j.

20. The neural network system of claim 19, wherein the integrated circuit is a field programmable gate array.

21. The neural network system of claim 20, wherein each of the lookup tables receives at most 6 input bit-values and outputs a single bit-value in response.

22. An electronic circuit for determining a multiplication result (p) of a weight value (w) and an input value (d) that is received dynamically, wherein determining the multiplication result comprises:
  configuring a plurality of lookup tables based on the weight value (w), wherein the lookup tables are configured in three layers; and
  outputting a respective bit ($p_i$) of the multiplication result (p) using the lookup tables based on specific combination of bits from the weight value w and from the input value d, wherein a notation $j_x$ represents the $x^{th}$ bit of j from the right, with bit $j_0$ being the rightmost bit of j.

23. The electronic circuit of claim 22, wherein:
  a first subset of the lookup tables determines bits $p_5$, $p_4$, $p_3$, $p_2$, $p_1$, and $p_0$ of the multiplication result p;
  a second subset of the lookup tables determines bits $p_8$, $p_7$, and $p_6$, of the multiplication result p;
  a third subset of the lookup tables determines bits $p_{16}$, $p_{15}$, $p_{14}$, $p_{13}$, $p_{12}$, $p_{11}$, and $p_{10}$ of the multiplication result p; and
  a fourth subset of the lookup tables determines bits $p_{19}$, $p_{18}$, and $p_{17}$ of the multiplication result p.

24. A device comprising:
  a field programmable gate array that includes a plurality of lookup tables configured in three layers to realize a multiplication circuit for two binary numbers w and d, wherein a binary multiplication result (p) of the binary numbers w and d is output by outputting each bit ($p_i$) from p using the lookup tables based on a specific combination of bits from the binary number w and from the binary number d.

25. The field programmable gate array of claim 24, wherein each of the lookup tables includes at most 6 inputs.

26. A method comprising:
  using the device of claim 24 to multiply (i) a 12-bit variable input binary number d by (ii) an 8-bit known value binary number w, wherein a binary multiplication result (p) is determined by determining each bit ($p_i$) from p using the lookup tables based on a specific combination of bits from the binary number w and from the binary number d.

27. The method of claim 26, wherein the input binary number is obtained from a 12-bit sensor.

* * * * *